US008626777B2

(12) United States Patent
LeTourneau

(10) Patent No.: US 8,626,777 B2
(45) Date of Patent: Jan. 7, 2014

(54) METHOD AND/OR SYSTEM FOR MANIPULATING TREE EXPRESSIONS

(75) Inventor: Jack J. LeTourneau, Santa Barbara, CA (US)

(73) Assignees: Robert T. Jenkins, Sacramento, CA (US), Trustee for the Jenkins Family Trust; Virginia T. Jenkins, Sacramento, CA (US), Trustee for the Jenkins Family Trust ( * ) Notice: Subject to any disclaimer, the term of this patent is extended or adjusted under 35 U.S.C. 154(b) by 204 days.

(21) Appl. No.: 12/578,411

(22) Filed: Oct. 13, 2009

(65) Prior Publication Data

US 2010/0094908 A1 Apr. 15, 2010

Related U.S. Application Data

(63) Continuation of application No. 11/006,841, filed on Dec. 7, 2004, now Pat. No. 7,627,591.

(60) Provisional application No. 60/623,280, filed on Oct. 29, 2004.

(51) Int. Cl.
*G06F 17/30* (2006.01)
*G06F 7/00* (2006.01)

(52) U.S. Cl.
USPC .......................................... 707/756; 707/802

(58) Field of Classification Search
USPC ....................................................... 707/756
See application file for complete search history.

(56) References Cited

U.S. PATENT DOCUMENTS

| | | | |
|---|---|---|---|
| 3,201,701 A | | 8/1965 | Maitra |
| 4,001,951 A | * | 1/1977 | Fasse ............................ 434/267 |
| 4,134,218 A | * | 1/1979 | Adams et al. ................. 434/267 |
| 4,156,910 A | | 5/1979 | Barton et al. |
| 4,439,162 A | * | 3/1984 | Blaine .......................... 434/268 |
| 4,677,550 A | | 6/1987 | Ferguson |
| 4,737,109 A | * | 4/1988 | Abramson ..................... 434/267 |
| 4,745,561 A | | 5/1988 | Hirosawa et al. |
| 4,751,684 A | | 6/1988 | Holt |
| 4,831,525 A | | 5/1989 | Saito et al. |
| 4,867,686 A | * | 9/1989 | Goldstein ..................... 434/267 |
| 4,905,138 A | | 2/1990 | Bourne |
| 4,931,928 A | | 6/1990 | Greenfeld |
| 4,949,388 A | | 8/1990 | Bhaskaran |
| 4,989,132 A | | 1/1991 | Mellender et al. |
| 4,991,087 A | | 2/1991 | Burkowski et al. |
| 5,021,943 A | | 6/1991 | Grimes |
| 5,021,992 A | | 6/1991 | Kondo |
| 5,191,522 A | | 3/1993 | Bosco et al. |
| 5,235,701 A | | 8/1993 | Ohler et al. |
| 5,265,245 A | | 11/1993 | Nordstrom et al. |
| 5,295,261 A | | 3/1994 | Simonetti |
| 5,335,345 A | | 8/1994 | Frieder et al. |
| 5,355,496 A | | 10/1994 | Fant et al. |
| 5,463,777 A | | 10/1995 | Bialkowski et al. |

(Continued)

OTHER PUBLICATIONS

Knuth: "The Art of Computer Programming", vol. 1, 2nd Edition, Addison-Wesley Publishing Company, 1973.*

(Continued)

*Primary Examiner* — Kuen Lu
(74) *Attorney, Agent, or Firm* — Berkeley Law & Technology Group, LLP

(57) ABSTRACT

Embodiments of methods and/or systems of manipulating tree expressions are disclosed.

28 Claims, 17 Drawing Sheets

(56) References Cited

U.S. PATENT DOCUMENTS

| | | |
|---|---|---|
| 5,493,504 A | 2/1996 | Minato |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,598,350 A | 1/1997 | Kawanishi et al. |
| 5,606,669 A * | 2/1997 | Bertin et al. ................. 709/223 |
| 5,687,362 A | 11/1997 | Bhargava et al. |
| 5,724,512 A | 3/1998 | Winterbottom |
| 5,724,576 A | 3/1998 | LeTourneau |
| 5,758,152 A | 5/1998 | LeTourneau |
| 5,781,906 A | 7/1998 | Aggarwal et al. |
| 5,787,415 A | 7/1998 | Jacobson et al. |
| 5,787,432 A | 7/1998 | LeTourneau |
| 5,796,356 A | 8/1998 | Okada et al. |
| 5,802,370 A | 9/1998 | Sitbon et al. |
| 5,822,593 A | 10/1998 | Lamping et al. |
| 5,848,159 A | 12/1998 | Collins et al. |
| 5,930,805 A | 7/1999 | Marquis |
| 5,970,490 A | 10/1999 | Morgenstern |
| 5,978,790 A | 11/1999 | Buneman et al. |
| 5,999,926 A * | 12/1999 | Suciu ................................ 707/5 |
| 6,002,879 A | 12/1999 | Radigan et al. |
| 6,003,033 A | 12/1999 | Amano et al. |
| 6,022,879 A | 2/2000 | Crow et al. |
| 6,055,537 A * | 4/2000 | LeTourneau ................. 707/101 |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,289,354 B1 | 9/2001 | Aggarwal et al. |
| 6,292,938 B1 | 9/2001 | Sarkar et al. |
| 6,336,812 B1 * | 1/2002 | Cooper et al. ................. 434/267 |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,611,844 B1 | 8/2003 | Saulpaugh et al. |
| 6,658,649 B1 | 12/2003 | Bates et al. |
| 6,714,939 B2 | 3/2004 | Saldanha et al. |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 * | 11/2004 | Charbonneau ................. 434/273 |
| 6,847,979 B2 | 1/2005 | Allemang et al. |
| 6,854,976 B1 * | 2/2005 | Suhr ................................ 434/273 |
| 6,874,005 B2 | 3/2005 | Fortenberry et al. |
| 6,965,990 B2 | 11/2005 | Barsness et al. |
| 6,968,330 B2 | 11/2005 | Edwards et al. |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,140,006 B2 | 11/2006 | Harrison et al. |
| 7,162,485 B2 | 1/2007 | Gottlob et al. |
| 7,191,182 B2 | 3/2007 | Anonsen et al. |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,356,802 B2 | 4/2008 | de Sutter et al. |
| 7,360,202 B1 | 4/2008 | Seshadri et al. |
| 7,419,376 B2 * | 9/2008 | Sarvazyan et al. ............. 434/273 |
| 7,475,070 B2 | 1/2009 | Fan et al. |
| 7,512,932 B2 | 3/2009 | Davidov et al. |
| 7,544,062 B1 * | 6/2009 | Hauschild et al. ............ 434/267 |
| 7,561,927 B2 | 7/2009 | Oyama et al. |
| 7,575,434 B2 * | 8/2009 | Palakodeti ..................... 434/267 |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,779,396 B2 | 8/2010 | Meijer et al. |
| 7,801,923 B2 | 9/2010 | LeTourneau |
| 7,882,147 B2 | 2/2011 | LeTourneau |
| 7,899,821 B1 | 3/2011 | Schiffmann et al. |
| 8,037,102 B2 | 10/2011 | LeTourneau |
| 8,060,868 B2 | 11/2011 | Meijer et al. |
| 8,316,059 B1 | 11/2012 | Schiffmann et al. |
| 8,356,040 B2 | 1/2013 | Letourneau |
| 8,443,339 B2 | 5/2013 | Letourneau |
| 2001/0003211 A1 | 6/2001 | Bera |
| 2002/0040292 A1 * | 4/2002 | Marcu ................................ 704/4 |
| 2002/0059281 A1 | 5/2002 | Watanabe et al. |
| 2002/0062259 A1 | 5/2002 | Katz et al. |
| 2002/0129315 A1 | 9/2002 | Bloch et al. |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2003/0041088 A1 | 2/2003 | Wilson et al. |
| 2003/0065659 A1 | 4/2003 | Agarwal et al. |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0024790 A1 | 2/2004 | Everett |
| 2004/0044659 A1 | 3/2004 | Judd et al. |
| 2004/0060007 A1 | 3/2004 | Gottlob et al. |
| 2004/0068498 A1 | 4/2004 | Patchet et al. |
| 2004/0103105 A1 | 5/2004 | Lindblad et al. |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 * | 12/2004 | Chan et al. ........................ 707/3 |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027743 A1 | 2/2005 | O'Neil et al. |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0125432 A1 | 6/2005 | Lin et al. |
| 2005/0138073 A1 | 6/2005 | Zhou et al. |
| 2005/0154265 A1 | 7/2005 | Miro et al. |
| 2005/0154979 A1 | 7/2005 | Chidlovskii et al. |
| 2005/0165732 A1 | 7/2005 | Burges |
| 2005/0187900 A1 | 8/2005 | LeTourneau |
| 2005/0214727 A1 * | 9/2005 | Stoianovici et al. .......... 434/262 |
| 2005/0267908 A1 | 12/2005 | LeTourneau |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 * | 1/2007 | Kitching et al. .............. 434/272 |
| 2007/0198538 A1 | 8/2007 | Palacios |

(56) References Cited

U.S. PATENT DOCUMENTS

2010/0094885 A1 4/2010 Andrews
2010/0094908 A1 4/2010 LeTourneau
2010/0114969 A1 5/2010 LeTourneau

OTHER PUBLICATIONS

U.S. Appl. No. 11/319,758, filed Dec. 27, 2005, Schiffmann.
U.S. Appl. No. 11/320,538, filed Dec. 27, 2005, LeTourneau, J.J.
U.S. Appl. No. 11/412,417, filed Apr. 26, 2006, Schiffmann.
U.S. Appl. No. 11/480,094, filed Apr. 26, 2006, LeTourneau, J.J.
U.S. Appl. No. 12/627,816, filed Nov. 30, 2009, Schiffmann.
U.S. Appl. No. 12/207,243, filed Feb. 8, 2010, LeTourneau, J.J.
U.S. Appl. No. 12/830,236, filed Jul. 2, 2010, LeTourneau, J.J.
"Core Technology Benchmarks a White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Apostol, "A Centennial History of the Prime Number Theorem", Engineering and Science, No. 4, 1996.
Cano et al., "Lazy Evaluation in Penniless Propagation over Join Trees", Networks, vol. 39(4), 2002 Wiley Periodicals, Inc., 175-185, 2002.
Cooper et al., "Oh! Pascal!", 1982, W.W. Norton & Company, Inc., Chapter 12, Arrays for Random Access, pp. 295-327.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Numbers for Cache Indexing to Eliminate Conflict Misses", Dept. of Electrical and Computer Engineering, North Carolina State University, Feb. 2004, 24 pages.
KILPELAINEN, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
LeTourneau, "The Elementary Theory of Object Oriented Arithmetic", pp. 1-9, Apr. 1990.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Reiss, "Semantics-Based Code Search", IEEE ICSE, pp. 243-253, 2009.
Sechrest et al., "Blending Hierarchical and Attribute-Based File Naming", Distributed Computing System, 1992, Proceedings of the 12th International Conference on Jun. 9-12, 1992, pp. 572-580.
Shanmugasundaram et al., "Querying SML Views of Relational Data", Proceedings of the $27^{th}$ VLDB Conference, Roma, Italy, 2001, 9 pages.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wu, "A Prime Number Labeling Scheme for Dynamic Ordered XML Trees", IEEE, 2004, 13 pages.
Zaks, S., "Lexicographic Generation of Ordered Trees", Dept. of Computer Science, University of Illinois, The Journal of Theoretical Computer Science, vol. 10(1), pp. 63-82, Revised 1978.
Dubiner, M., Galli, Z., and Magen, E. "Faster Tree Pattern Matching.", Journal of the Association for Computing Machinery, vol. 41, No. 2, Mar. 1994, pp. 205-213.
Ramesh, R. and Ramakrishnan, I.V., "Nonlinear Pattern Matching in Trees." Journal of the Association for Computer Machinery, vol. 39, No. 2. Apr. 1992, pp. 295-316.
Durango Bill's Enumeration of Trees. http://web.archive.org/web/20021028184112/http://www.durangobill.com/Trees.html, 1998.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, January.
U.S. Appl. No. 11/005,859, filed Dec. 6, 2004, 120 pages.
U.S. Appl. No. 11/005,859 Notice to File Missing parts mailed Jan. 10, 2005, 2 pages.
U.S. Appl. No. 11/005,859 Response to Notice to File Missing parts mailed Apr. 1, 2005, 9 pages.
U.S. Appl. No. 11/005,859 Preliminary Amendment filed Apr. 28, 2005, 193 pages.
U.S. Appl. No. 11/005,859 Office Action—Restriction Requirement mailed Dec. 12, 2007, 7 pages.
U.S. Appl. No. 11/005,859 Response to Office Action—Restriction Requirement filed Jan. 14, 2008, 82 pages.
U.S. Appl. No. 11/005,859 Non-final Office Action mailed Mar. 21, 2008, 10 pages.
U.S. Appl. No. 11/005,859 Amendment filed Jul. 21, 2008, 86 pages.
U.S. Appl. No. 11/005,859 Final Office Action mailed Oct. 30, 2008, 14 pages.
U.S. Appl. No. 11/005,859 Amendment filed Dec. 30, 2008, 83 pages.
U.S. Appl. No. 11/005,859 Advisory Action mailed Jan. 13, 2009, 4 pages.

(56) References Cited

OTHER PUBLICATIONS

U.S. Appl. No. 11/005,859 RCE with amendment filed Apr. 30, 2009, 86 pages.
U.S. Appl. No. 11/005,859 Final Office Action mailed Jul. 8, 2009, 9 pages.
U.S. Appl. No. 11/005,859 Examiner Interview Summary received Oct. 27, 2009, 3 pages.
U.S. Appl. No. 11/005,859 Amendment filed Dec. 8, 2009, 83 pages.
U.S. Appl. No. 11/005,859 Advisory Action mailed Dec. 22, 2009, 3 pages.
U.S. Appl. No. 11/005,859 RCE with Amendment filed Jan. 7, 2010, 85 pages.
U.S. Appl. No. 11/005,859 Non-Final Office Action mailed Jan. 21, 2010, 8 pages.
U.S. Appl. No. 11/005,859 Response to Non-Final Office Action filed Feb. 25, 2010, 83 pages.
U.S. Appl. No. 11/005,859 Final Office Action mailed Jun. 8, 2010, 9 pages.
U.S. Appl. No. 11/005,859 Office Action Response mailed Sep. 1, 2010, 89 pages.
U.S. Appl. No. 11/005,859 Advisory Action mailed Sep. 14, 2010, 3 pages.
U.S. Appl. No. 11/005,859 Notice of Appeal mailed Sep. 29, 2010, 1 page.
U.S. Appl. No. 11/005,859 Office Action mailed Oct. 15, 2010.
U.S. Appl. No. 11/005,859 Office Action Response mailed Jan. 18, 2011, 95 pages.
U.S. Appl. No. 11/005,859 Final Office Action mailed Mar. 30, 2011, 7 pages.
U.S. Appl. No. 11/005,859 Notice of Allowance and Fees Due, mailed Jun. 9, 2011, 11 pages.
U.S. Appl. No. 11/005,859 Amendment after Notice of Allowance and Issue Fee Payment, mailed Sep. 9, 2011, 2 pages.
U.S. Appl. No. 11/005,859 Issue Notification, mailed Sep. 21, 2011, 1 page.
U.S. Appl. No. 11/007,139 Application filed Dec. 7, 2004, 90 pages.
U.S. Appl. No. 11/007,139 Notice to File Missing Parts mailed Jan. 19, 2005, 2 pages.
U.S. Appl. No. 11/007,139 Response to Notice to File Missing Parts mailed Apr. 1, 2005, 9 pages.
U.S. Appl. No. 11/007,139 Preliminary Amendment filed Apr. 28, 2005, 146 pages.
U.S. Appl. No. 11/007,139 Non-final Office Action mailed May 14, 2007, 58 pages.
U.S. Appl. No. 11/007,139 Amendment filed Oct. 15, 2007, 32 pages.
U.S. Appl. No. 11/007,139 Supplemental Response filed Oct. 17, 2007, 7 pages.
U.S. Appl. No. 11/007,139 Non-final Office Action mailed Jan. 2, 2008 with Examiner's search results, 21 pages.
U.S. Appl. No. 11/007,139 Amendment filed Apr. 2, 2008, 30 pages.
U.S. Appl. No. 11/007,139 Final Office Action mailed Aug. 15, 2008, 30 pages.
U.S. Appl. No. 11/007,139 Amendment filed Oct. 15, 2008, 26 pages.
U.S. Appl. No. 11/007,139 Advisory Action mailed Oct. 22, 2008, 26 pages.
U.S. Appl. No. 11/007,139 RCE with Amendment filed Nov. 14, 2008, 32 pages.
U.S. Appl. No. 11/007,139 Non-final Office Action mailed Dec. 8, 2008, 24 pages.
U.S. Appl. No. 11/007,139 Amendment filed May 8, 2009, 31 pages.
U.S. Appl. No. 11/007,139 Final Office Action mailed Aug. 4, 2009, 26 pages.
U.S. Appl. No. 11/007,139 Amendment filed Dec. 4, 2009, 28 pages.
U.S. Appl. No. 11/007,139 Advisory Action mailed Dec. 14, 2009, 4 pages.
U.S. Appl. No. 11/007,139 RCE with amendment filed Jan. 4, 2010, 27 pages.
U.S. Appl. No. 11/007,139 Non-Final Office Action mailed Jan. 27, 2010, 31 pages.
U.S. Appl. No. 11/007,139 Response to Non-Final Office Action filed Apr. 27, 2010, 30 pages.
U.S. Appl. No. 11/007,139 Office Action mailed Jul. 20, 2010, 20 pages.
U.S. Appl. No. 11/007,139 Office Action response mailed Oct. 20, 2010, 33 pages.
U.S. Appl. No. 11/007,139 Advisory Action mailed Oct. 25, 2010, 2 pages.
U.S. Appl. No. 11/007,139 Office Action response mailed Nov. 18, 2010, 24 pages.
U.S. Appl. No. 11/007,139 Advisory Action mailed Dec. 1, 2010, 4 pages.
U.S. Appl. No. 11/007,139 Office Action response and Notice of Appeal mailed Dec. 20, 2010, 29 pages.
U.S. Appl. No. 11/007,139 Office Action mailed Jan. 3, 2011, 24 pages.
U.S. Appl. No. 11/007,139 Office Action response, mailed May 3, 2011, 27 pages.
U.S. Appl. No. 11/007,139 Final Office Action, mailed Jul. 18, 2011, 23 pages.
U.S. Appl. No. 11/007,139 Amendment after final mailed Oct. 18, 2011, 30 pages.
U.S. Appl. No. 11/007,139 Advisory Action and rule 312 amendment, mailed Nov. 4, 2011, 4 pages.
U.S. Appl. No. 11/007,139 Notice of Appeal filed Nov. 16, 2011, 1 page.
U.S. Appl. No. 11/006,320 Application filed Dec. 6, 2004, 75 pages.
U.S. Appl. No. 11/006,320 Response to Missing Parts and Preliminary Amendment filed May 9, 2005, 135 pages.
U.S. Appl. No. 11/006,320 Office Action—Restriction Requirement mailed Mar. 26, 2007, 7 pages.
U.S. Appl. No. 11/006,320 Response to Restriction Requirement filed Apr. 27, 2007, 34 pages.
U.S. Appl. No. 11/006,320 Notice of Non-Compliant Amendment mailed Jul. 6, 2007, 3 pages.
U.S. Appl. No. 11/006,320 Response to Non-Compliant Amendment filed Jul. 25, 2007, 33 pages.
U.S. Appl. No. 11/006,320 Non-final Office Action mailed Oct. 1, 2007, 24 pages.
U.S. Appl. No. 11/006,320 Amendment filed Jan. 29, 2008, 45 pages.
U.S. Appl. No. 11/006,320 Notice of Non-Compliant Amendment mailed Apr. 8, 2008, 4 pages.
U.S. Appl. No. 11/006,320 Amendment filed May 5, 2008, 44 pages.
U.S. Appl. No. 11/006,320 Non-final Office Action mailed Aug. 15, 2008, 33 pages.
U.S. Appl. No. 11/006,320 Amendment filed Nov. 14, 2008, 40 pages.
U.S. Appl. No. 11/006,320 Office Action—Shortened Statutory Period mailed Jan. 27, 2009, 2 pages.
U.S. Appl. No. 11/006,320 Amendment filed Apr. 27, 2009, 44 pages.
U.S. Appl. No. 11/006,320 Final Office Action mailed Jul. 29, 2009, 13 pages.
U.S. Appl. No. 11/006,320 Amendment filed Nov. 30, 2009, 10 pages.
U.S. Appl. No. 11/006,320 Non-final Office Action mailed Dec. 4, 2009, 25 pages.
U.S. Appl. No. 11/006,320 Response to Non-Final Office Action filed Feb. 23, 2010, 11 pages.
U.S. Appl. No. 11/006,320 Final Office Action mailed May 24, 2010, 11 pages.
U.S. Appl. No. 11/006,320 Office Action response mailed Aug. 24, 2010, 15 pages.
U.S. Appl. No. 11/006,320 Notice of Allowance mailed Sep. 17, 2010, 8 pages.
U.S. Appl. No. 11/006,320 Examiner Interview Summary and supplemental Notice of Allowance mailed Dec. 17, 2010, 9 pages.
U.S. Appl. No. 11/006,320 Rule 312 Amendment and Issue Fee payment mailed Dec. 17, 2010, 10 pages.
U.S. Appl. No. 11/006,320 Issue Notification mailed Jan. 12, 2011, 1 page.
U.S. Appl. No. 12/972,326 Application as filed on Dec. 17, 2010, 74 pages.

(56) References Cited

OTHER PUBLICATIONS

U.S. Appl. No. 12/972,326 Filing receipt and Notice to File Missing Parts mailed Jan. 6, 2011, 5 pages.
U.S. Appl. No. 12/972,326 Response to Notice to File Missing parts mailed Jan. 26, 2011, 14 pages.
U.S. Appl. No. 12/972,326 Filing Receipt, mailed Feb. 18, 2011, 3 pages.
U.S. Appl. No. 12/972,326 Preliminary amendment mailed May 20, 2011, 15 pages.
U.S. Appl. No. 12/972,326 Notice of publication and non-compliant amendment mailed Jun. 2, 2011, 3 pages.
U.S. Appl. No. 12/972,326 Preliminary amendment mailed Jul. 5, 2011, 21 pages.
U.S. Appl. No. 12/972,326 Notice of additional fee due, mailed Jul. 12, 2011, 2 pages.
U.S. Appl. No. 12/972,326 Preliminary Amendment mailed Aug. 10, 2011, 7 pages.
U.S. Appl. No. 13/014,677 Application as filed on Jan. 26, 2011, 90 pages.
U.S. Appl. No. 13/014,677 Notice to file missing parts and filing receipt, mailed Mar. 23, 2011, 5 pages.
U.S. Appl. No. 13/014,677 Notice of Abandonment mailed Nov. 29, 2011, 2 pages.
U.S. Appl. No. 11/006,848 Application as filed Dec. 7, 2004, 59 pages.
U.S. Appl. No. 11/006,848 Notice to File Missing Parts mailed Mar. 18, 2005, 2 pages.
U.S. Appl. No. 11/006,848 Response to Notice to File Missing Parts mailed Mar. 3, 2005, 101 pages.
U.S. Appl. No. 11/006,848 Non-Final Office Action mailed Apr. 4, 2007, 11 pages.
U.S. Appl. No. 11/006,848 Response to Non-Final Office Action mailed Oct. 3, 2007, 20 pages.
U.S. Appl. No. 11/006,848 Supplemental Amendment mailed Nov. 13, 2007, 4 pages.
U.S. Appl. No. 11/006,848 Non-Final Office Action mailed Feb. 5, 2008, 16 pages.
U.S. Appl. No. 11/006,848 Response to Non-Final Office Action filed Aug. 4, 2008, 27 pages.
U.S. Appl. No. 11/006,848 Final Office Action mailed Dec. 2, 2008, 30 pages.
U.S. Appl. No. 11/006,848 RCE filed May 4, 2009, 24 pages.
U.S. Appl. No. 11/006,848 Notice of Allowance mailed Jun. 11, 2009, 8 pages.
U.S. Appl. No. 11/006,848 Issue fee mailed Sep. 11, 2009, 10 pages.
U.S. Appl. No. 11/006,848 Issue Notification mailed Oct. 28, 2009, 1 page.
U.S. Appl. No. 12/573,829 Application as filed on Oct. 5, 2009, 64 pages.
U.S. Appl. No. 12/573,829 Notice to File Missing Parts and Filing Receipt mailed Oct. 20, 2009, 5 pages.
U.S. Appl. No. 12/573,829 Preliminary Amendment mailed Dec. 21, 2009, 17 pages.
U.S. Appl. No. 12/573,829 Filing receipt mailed Jan. 4, 2010, 5 pages.
U.S. Appl. No. 12/573,829 Notice of Publication mailed Apr. 15, 2010, 1 page.
U.S. Appl. No. 12/573,829 Office Action mailed Jun. 28, 2010, 35 pages.
U.S. Appl. No. 12/573,829 Office Action Response mailed Sep. 28, 2010, 22 pages.
U.S. Appl. No. 12/573,829 Office Action mailed Nov. 1, 2010, 29 pages.
U.S. Appl. No. 12/573,829 Office Action Response mailed Jan. 3, 2011, 29 pages.
U.S. Appl. No. 12/573,829 Advisory Action mailed Jan. 7, 2011, 3 pages.
U.S. Appl. No. 12/573,829 Notice of Appeal mailed Jan. 11, 2011, 1 page.
U.S. Appl. No. 12/573,829 Appeal Brief, mailed May 4, 2011, 68 pages.
U.S. Appl. No. 12/573,829 Reply brief filed Sep. 21, 2011, 17 pages.
U.S. Appl. No. 12/573,829 Reply brief noted Oct. 5, 2011, 2 pages.
U.S. Appl. No. 12/573,829 Appeal Docketing notice Oct. 11, 2011, 2 pages.
U.S. Appl. No. 11/006,841 Application as filed on Dec. 7, 2004, 63 pages.
U.S. Appl. No. 11/006,841 Notice to file missing parts mailed Jan. 10, 2005, 2 pages.
U.S. Appl. No. 11/006,841 Response to Notice to file missing parts and preliminary amendment mailed Apr. 14, 2005, 105 pages.
U.S. Appl. No. 11/006,841 Non-Final OA mailed Apr. 6, 2007, 16 pages.
U.S. Appl. No. 11/006,841 Response to Non-Final OA mailed Sep. 6, 2007, 63 pages.
U.S. Appl. No. 11/006,841 Restriction Requirement mailed Nov. 27, 2007, 5 pages.
U.S. Appl. No. 11/006,841 Restriction Requirement response mailed Dec. 7, 2007, 36 pages.
U.S. Appl. No. 11/006,841 Restriction Requirement mailed Mar. 17, 2008, 9 pages.
U.S. Appl. No. 11/006,841 Response to Restriction Requirement mailed Jul. 17, 2008, 33 pages.
U.S. Appl. No. 11/006,841, Final Office Action mailed Oct. 29, 2008, 54 pages.
U.S. Appl. No. 11/006,841 Response to Final Office Action mailed Dec. 29, 2008, 45 pages.
U.S. Appl. No. 11/006,841 Advisory Action mailed Jan. 6, 2009, 3 pages.
U.S. Appl. No. 11/006,841 RCE mailed Apr. 23, 2009, 48 pages.
U.S. Appl. No. 11/006,841 Supplemental Response mailed Jun. 26, 2009, 34 pages.
U.S. Appl. No. 11/006,841 Notice of Allowance mailed Jun. 29, 2009, 40 pages.
U.S. Appl. No. 11/006,841 Issue Fee mailed Sep. 29, 2009, 4 pages.
U.S. Appl. No. 11/006,841 Issue Notification mailed Nov. 11, 2009, 1 page.
U.S. Appl. No. 12/578,411 Continuation application filed Oct. 13, 2009, 75 pages.
U.S. Appl. No. 12/578,411 Notice of Missing Parts mailed Oct. 28, 2009, 6 pages.
U.S. Appl. No. 12/578,411 Response to Missing Parts filed Dec. 28, 2009, 25 pages.
U.S. Appl. No. 12/578,411 Filing Receipt mailed Jan. 7, 2010, 3 pages.
U.S. Appl. No. 12/578,411 Notice of Publication mailed Apr. 15, 2010, 1 page.
U.S. Appl. No. 12/578,411 Restriction requirement mailed Jun. 8, 2011, 6 pages.
U.S. Appl. No. 12/578,411 Response to restriction requirement mailed Jul. 6, 2011, 19 pages.
U.S. Appl. No. 12/578,411 Non-Final Office Action, mailed Aug. 23, 2011, 19 pages.
U.S. Appl. No. 12/578,411 Non-Final Office Action response mailed Dec. 22, 2011, 38 pages.
U.S. Appl. No. 11/006,440 Application as filed on Dec. 6, 2004, 85 pages.
U.S. Appl. No. 11/006,440 Notice to file missing parts Jan. 11, 2005, 2 pages.
U.S. Appl. No. 11/006,440 Response to Notice to file missing parts mailed Mar. 15, 2005, 8 pages.
U.S. Appl. No. 11/006,440 Preliminary Amendment mailed Apr. 28, 2005, 140 pages.
U.S. Appl. No. 11/006,440 Preliminary Amendment and Substitute Specification mailed Oct. 10, 2006, 139 pages.
U.S. Appl. No. 11/006,440 Restriction Requirement mailed Mar. 29, 2007, 5 pages.
U.S. Appl. No. 11/006,440 Response to Restriction Requirement mailed Apr. 30, 2007, 42 pages.
U.S. Appl. No. 11/006,440 Non-Final Office Action mailed Jun. 21, 2007, 15 pages.

(56) References Cited

OTHER PUBLICATIONS

U.S. Appl. No. 11/006,440 Response to Non-Final Office Action mailed Nov. 20, 2007, 42 pages.
U.S. Appl. No. 11/006,440 Final Office Action mailed Feb. 6, 2008, 13 pages.
U.S. Appl. No. 11/006,440 Response to Final Office Action mailed Apr. 7, 2008, 34 pages.
U.S. Appl. No. 11/006,440 Advisory Action mailed May 9, 2008, 3 pages.
U.S. Appl. No. 11/006,440 Notice of appeal mailed Aug. 4, 2008, 1 page.
U.S. Appl. No. 11/006,440 RCE mailed Nov. 14, 2008, 39 pages.
U.S. Appl. No. 11/006,440 Final Office Action mailed Jan. 23, 2009, 22 pages.
U.S. Appl. No. 11/006,440 Amendment after Final mailed Apr. 23, 2009, 34 pages.
U.S. Appl. No. 11/006,440 Supplemental Amendment mailed Jul. 17, 2009, 29 pages.
U.S. Appl. No. 11/006,440 Notice of Allowance mailed Jul. 31, 2009, 15 pages.
U.S. Appl. No. 11/006,440 Examiner's Amendment and Reasons for Allowance mailed Sep. 3, 2009, 9 pages.
U.S. Appl. No. 11/006,440 Issue Fee mailed Nov. 2, 2009, 12 pages.
U.S. Appl. No. 11/006,440 Issue Notification mailed Dec. 2, 2009, 1 page.
U.S. Appl. No. 12/627,816 Continuation application filed Nov. 30, 2009, 95 pages.
U.S. Appl. No. 12/627,816 Notice of Missing Parts mailed Dec. 15, 2009, 2 pages.
U.S. Appl. No. 12/627,816 Response to Missing Parts filed Apr. 12, 2010, 21 pages.
U.S. Appl. No. 12/627,816 Filing Receipt mailed Apr. 20, 2010, 3 pages.
U.S. Appl. No. 12/627,816 Notice of Publication mailed Jul. 29, 2010, 1 page.
U.S. Appl. No. 12/627,816 Non-Final OA, mailed May 5, 2011, 19 pages.
U.S. Appl. No. 12/627,816 Non-Final OA response, mailed Nov. 7, 2011, 12 pages.
U.S. Appl. No. 12/627,816 Final Rejection mailed Nov. 17, 2011, 18 pages.
U.S. Appl. No. 11/006,446 Application filed Dec. 6, 2004, 91 pages.
U.S. Appl. No. 11/006,446 Notice of Missing Parts mailed Jan. 24, 2005, 3 pages.
U.S. Appl. No. 11/006,446 Response to Notice to File Missing Parts mailed Mar. 29, 2005, 8 pages.
U.S. Appl. No. 11/006,446 Preliminary Amendment filed Apr. 28, 2005, 118 pages.
U.S. Appl. No. 11/006,446 Office Action—Restriction Requirement mailed Apr. 4, 2007, 5 pages.
U.S. Appl. No. 11/006,446 Response to Office Action—Restriction Requirement filed May 3, 2007, 6 pages.
U.S. Appl. No. 11/006,446 Non-final Office Action mailed Jul. 26, 2007, 45 pages.
U.S. Appl. No. 11/006,446 Amendment filed Nov. 26, 2007, 38 pages.
U.S. Appl. No. 11/006,446 Non-final Office Action mailed Feb. 20, 2008, 67 pages.
U.S. Appl. No. 11/006,446 Amendment filed Jul. 21, 2008, 33 pages.
U.S. Appl. No. 11/006,446 Final Office Action mailed Oct. 28, 2008, 49 pages.
U.S. Appl. No. 11/006,446 Amendment filed Dec. 29, 2008, 33 pages.
U.S. Appl. No. 11/006,446 Advisory Action mailed Jan. 7, 2009, 4 pages.
U.S. Appl. No. 11/006,446 RCE with Amendment filed Apr. 28, 2009, 38 pages.
U.S. Appl. No. 11/006,446 Non-final Office Action mailed Jul. 7, 2009, 41 pages.
U.S. Appl. No. 11/006,446 Examiner Interview Summary and Search Results mailed Oct. 26, 2009, 6 pages.
U.S. Appl. No. 11/006,446 Amendment mailed Dec. 7, 2009, 33 pages.
U.S. Appl. No. 11/006,446 Examiner Interview Summary mailed Mar. 19, 2010, 4 pages.
U.S. Appl. No. 11/006,446 Notice of Allowance/Allowability mailed Mar. 19, 2010, 29 pages.
U.S. Appl. No. 11/006,446 Issue Fee Payment and 312 Amendment filed Jun. 21, 2010, 23 pages.
U.S. Appl. No. 11/006,446 Rule 312 Amendment mailed Aug. 19, 2010 2 pages.
U.S. Appl. No. 11/006,446 Formal drawings mailed Aug. 25, 2010, 29 pages.
U.S. Appl. No. 11/006,446 Issue Notification mailed Sep. 1, 2010, 1 page.
U.S. Appl. No. 12/830,236 Divisional Application filed Jul. 2, 2010, 103 pages.
U.S. Appl. No. 12/830,236 Notice to File Corrected Application Papers mailed Jul. 16, 2010, 5 pages.
U.S. Appl. No. 12/830,236 Response to Notice to File Corrected Application Papers mailed Aug. 25, 2010, 32 pages.
U.S. Appl. No. 12/830,236 Filing receipt mailed Sep. 3, 2010, 3 pages.
U.S. Appl. No. 12/830,236 Notice of Publication mailed Dec. 16, 2010, 1 page.
U.S. Appl. No. 12/830,236 Restriction requirement mailed Mar. 18, 2011, 6 pages.
U.S. Appl. No. 12/830,236 Restriction requirement response, mailed Apr. 18, 2011, 5 pages.
U.S. Appl. No. 12/830,236 Non-Final Office Action, mailed May 11, 2011, 10 pages.
U.S. Appl. No. 12/830,236 Response to Non-Final Office Action mailed Jul. 6, 2011, 18 pages.
U.S. Appl. No. 12/830,236 Final Office Action, mailed Oct. 14, 2011, 18 pages.
U.S. Appl. No. 11/385,257 Application filed Mar. 20, 2006, 118 pages.
U.S. Appl. No. 11/385,257 Notice of Missing Parts mailed May 3, 2006, 2 pages.
U.S. Appl. No. 11/385,257 Response to Missing Parts filed Aug. 3, 2006, 46 pages.
U.S. Appl. No. 11/385,257 Notice of Publication mailed Nov. 30, 2006, 1 page.
U.S. Appl. No. 11/385,257 Non-final Office Action mailed Apr. 29, 2008, 44 pages.
U.S. Appl. No. 11/385,257 Amendment filed Jul. 29, 2008, 29 pages.
U.S. Appl. No. 11/385,257 Final Office Action mailed Dec. 9, 2008, 47 pages.
U.S. Appl. No. 11/385,257 RCE with Amendment filed May 11, 2009, 38 pages.
U.S. Appl. No. 11/385,257 Supplemental Amendment filed May 26, 2009, 32 pages.
U.S. Appl. No. 11/385,257 Notice of Non-Compliant Amendment mailed Jun. 1, 2009, 3 pages.
U.S. Appl. No. 11/285,257 Amendment filed Jun. 30, 2009, 34 pages.
U.S. Appl. No. 11/385,257 Non-Final Office Action mailed Sep. 14, 2009, 60 pages.
U.S. Appl. No. 11/385,257 Response to Non-Final Office Action filed Jan. 13, 2010, 34 pages.
U.S. Appl. No. 11/385,257 Final Office Action mailed Apr. 12, 2010, 47 pages.
U.S. Appl. No. 11/385,257 RCE mailed Aug. 12, 2010, 35 pages.
U.S. Appl. No. 11/385,257 Office Action mailed Sep. 30, 2009, 39 pages.
U.S. Appl. No. 11/385,257 Office Action response, mailed Mar. 29, 2011, 31 pages.
U.S. Appl. No. 11/385,257 Final Rejection mailed Jun. 1, 2011, 40 pages.
U.S. Appl. No. 11/385,257 Request for continued Examination mailed Nov. 1, 2011, 30 pages.
U.S. Appl. No. 11/319,758 Application filed Dec. 27, 2005, 79 pages.

(56) References Cited

OTHER PUBLICATIONS

U.S. Appl. No. 11/319,758 Notice of Missing Parts mailed Feb. 1, 2006, 2 pages.
U.S. Appl. No. 11/319,758 Response to Missing Parts filed Jul. 3, 2006, 15 pages.
U.S. Appl. No. 11/319,758 Non-final Office Action mailed Nov. 12, 2008, 46 pages.
U.S. Appl. No. 11/319,758 Amendment filed May 12, 2009, 40 pages.
U.S. Appl. No. 11/319,758 Final Office Action mailed Aug. 3, 2009, 39 pages.
U.S. Appl. No. 11/319,758 RCE filed Jan. 4, 2010, 45 pages.
U.S. Appl. No. 11/319,758 Non-Final Office Action mailed Mar. 30, 2010, 39 pages.
U.S. Appl. No. 11/319,758 Office Action response mailed Jul. 29, 2010, 30 pages.
U.S. Appl. No. 11/319,758 Final Office Action mailed Oct. 28, 2010, 31 pages.
U.S. Appl. No. 11/319,758 Request for Continued Examination, mailed Mar. 28, 2011, 32 pages.
U.S. Appl. No. 11/319,758 Non-Final office action mailed Jun. 3, 2011, 31 pages.
U.S. Appl. No. 11/319,758 Non-Final Office Action Response mailed Nov. 3, 2011, 29 pages.
U.S. Appl. No. 11/006,842 Application as filed Dec. 7, 2004, 58 pages.
U.S. Appl. No. 11/006,842 Notice to file missing parts Jan. 10, 2005, 2 pages.
U.S. Appl. No. 11/006,842 Response to Notice to file missing parts mailed Apr. 1, 2005, 7 pages.
U.S. Appl. No. 11/006,842 Preliminary Amendment mailed May 2, 2005, 93 pages.
U.S. Appl. No. 11/006,842 Restriction Requirement mailed Jan. 23, 2008, 5 pages.
U.S. Appl. No. 11/006,842 Response to Restriction Requirement mailed Feb. 25, 2008, 25 pages.
U.S. Appl. No. 11/006,842, Restriction Requirement mailed May 13, 2008, 5 pages.
U.S. Appl. No. 11/006,842 Response to Restriction Requirement Aug. 13, 2008, 24 pages.
U.S. Appl. No. 11/006,842 Non-Final Office Action mailed Nov. 3, 2008.
U.S. Appl. No. 11/006,842 Response to Non-Final Office Action mailed May 4, 2009, 35 pages.
U.S. Appl. No. 11/006,842 Supplemental Response mailed Jul. 17, 2009, 23 pages.
U.S. Appl. No. 11/006,842 Notice of Allowance mailed Jul. 27, 2009, 13 pages.
U.S. Appl. No. 11/006,842 Issue Fee filed Oct. 27, 2009, 1 page.
U.S. Appl. No. 11/006,842 Issue notification mailed Nov. 18, 2009, 1 page.
U.S. Appl. No. 12/613,450 Continuation application filed Nov. 5, 2009, 63 pages.
U.S. Appl. No. 12/613,450 Notice of Missing Parts mailed Nov. 18, 2009, 2 pages.
U.S. Appl. No. 12/613,450 Preliminary Amendment and Response to Missing Parts filed Jan. 19, 2010, 16 pages.
U.S. Appl. No. 12/613,450 Filing receipt mailed Jan. 27, 2010, 3 pages.
U.S. Appl. No. 12/613,450 Notice of Publication mailed May 6, 2010, 1 page.
U.S. Appl. No. 12/613,450 Restriction requirement mailed Jun. 10, 2011, 5 pages.
U.S. Appl. No. 12/613,450 Response to restriction requirement mailed Jul. 6, 2011, 17 pages.
U.S. Appl. No. 12/613,450 Non-Final OA response mailed Dec. 27, 2011, 28 pages.
U.S. Appl. No. 11/320,538 Application filed Dec. 27, 2005, 76 pages.
U.S. Appl. No. 11/320,538 Notice of Missing Parts mailed Feb. 2, 2006, 2 pages.
U.S. Appl. No. 11/320,538 Response to Missing Parts filed Aug. 2, 2006, 36 pages.
U.S. Appl. No. 11/320,538 Non-final Office Action mailed Apr. 1, 2009, 27 pages.
U.S. Appl. No. 11/320,538 Amendment filed Jul. 1, 2009, 54 pages.
U.S. Appl. No. 11/320,538 Final Office Action mailed Nov. 2, 2009, 29 pages.
U.S. Appl. No. 11/320,538 Response to Final Office Action filed Jan. 4, 2010, 23 pages.
U.S. Appl. No. 11/320,538 Advisory Action mailed Jan. 19, 2010, 3 pages.
U.S. Appl. No. 11/320,538 RCE and Amendment filed Apr. 2, 2010, 26 pages.
U.S. Appl. No. 11/320,538 Non-Final Office Action mailed Jun. 9, 2010, 24 pages.
U.S. Appl. No. 11/320,538 Office action mailed Dec. 22, 2010, 10 pages.
U.S. Appl. No. 11/320,538 Notice of Appeal, mailed May 23, 2011, 6 pages.
U.S. Appl. No. 11/320,538 Pre-brief appeal conference decision mailed Jun. 30, 2011, 2 pages.
U.S. Appl. No. 11/320,538 Request for Continued Examination mailed Dec. 23, 2011, 21 pages.
U.S. Appl. No. 11/361,500 Application as filed on Feb. 23, 2006, 72 pages.
U.S. Appl. No. 11/361,500 Notice to file missing parts mailed Mar. 23, 2006, 2 pages.
U.S. Appl. No. 11/361,500 Response to Notice to File Missing Parts mailed Jul. 19, 2006, 27 pages.
U.S. Appl. No. 11/361,500 Notice of Publication mailed Nov. 16, 2006, 1 page.
U.S. Appl. No. 11/361,500 Office Action mailed May 27, 2009, 18 pages.
U.S. Appl. No. 11/361,500 Response to Office Action mailed Aug. 27, 2009, 34 pages.
U.S. Appl. No. 11/361,500 Notice of Allowance mailed Dec. 11, 2009, 8 pages.
U.S. Appl. No. 11/361,500 Issue Fee Payment and Rule 312 Amendment mailed Jan. 6, 2010, 28 pages.
U.S. Appl. No. 11/361,500 Response to Rule 312 Amendment Jan. 25, 2010, 4 pages.
U.S. Appl. No. 11/361,500 Issue Notification mailed Feb. 24, 2010, 1 page.
U.S. Appl. No. 12/702,243 Continuation Application with Preliminary Amendment filed Feb. 8, 2010, 83 pages.
U.S. Appl. No. 12/702,243 Notice of Missing Parts mailed Feb. 25, 2010, 2 pages.
U.S. Appl. No. 12/702,243 Response to Missing Parts filed Apr. 26, 2010, 8 pages.
U.S. Appl. No. 12/702,243 Filing receipt mailed May 4, 2010, 3 pages.
U.S. Appl. No. 12/702,243 Notice of Publication mailed Aug. 12, 2010, 1 page.
U.S. Appl. No. 11/412,417 Application filed Apr. 26, 2006, 96 pages.
U.S. Appl. No. 11/412,417 Notice of Missing Parts mailed May 19, 2006, 2 pages.
U.S. Appl. No. 11/412,417 Response to Notice of Missing Parts filed Jul. 19, 2006, 14 pages.
U.S. Appl. No. 11/412,417 Non-final Office Action mailed Apr. 1, 2008, 53 pages.
U.S. Appl. No. 11/412,417 Amendment filed Aug. 1, 2008, 34 pages.
U.S. Appl. No. 11/412,417 Final Office Action mailed Nov. 13, 2008, 40 pages.
U.S. Appl. No. 11/412,417 RCE and Amendment filed May 12, 2009, 36 pages.
U.S. Appl. No. 11/412,417 Non-final Office Action mailed Jun. 30, 2009, 141 pages.
U.S. Appl. No. 11/412,417 Examiner Interview Summary mailed Oct. 30, 2009, 3 pages.
U.S. Appl. No. 11/412,417 Amendment filed Oct. 30, 2009, 33 pages.
U.S. Appl. No. 11/412,417 Final Office Action mailed Jan. 4, 2010, 37 pages.

(56) References Cited

OTHER PUBLICATIONS

U.S. Appl. No. 11/412,417 RCE with Amendment filed May 4, 2010, 27 pages.
U.S. Appl. No. 11/412,417 Supplemental Office Action Response mailed Jun. 22, 2010, 22 pages.
U.S. Appl. No. 11/412,417 Notice of Allowance and bibliographic data sheet mailed Jul. 6, 2010, 9 pages.
U.S. Appl. No. 11/412,417 RCE mailed Oct. 5, 2010, 4 pages.
U.S. Appl. No. 11/412,417 Notice of Allowance and bibliographic data sheet mailed Oct. 26, 2010, 4 pages.
U.S. Appl. No. 11/412,417 Issue Fee Payment and Comments on Reasons for Allowance mailed Jan. 26, 2011, 6 pages.
U.S. Appl. No. 11/412,417 Issue Notification mailed Feb. 9, 2011, 1 page.
U.S. Appl. No. 13/030,084 Application filed Feb. 17, 2011, 103 pages.
U.S. Appl. No. 13/030,084 Filing receipt and Notice to File Missing parts mailed Mar. 3, 2011, 6 pages.
U.S. Appl. No. 13/030,084 Response to Notice to File Missing Parts, mailed Aug. 3, 2011, 23 pages.
U.S. Appl. No. 13/030,084 Updated filing receipt, mailed Aug. 11, 2011, 3 pages.
U.S. Appl. No. 13/030,084 Non-Final Rejection mailed Oct. 26, 2011, 34 pages.
U.S. Appl. No. 13/030,084 Notice of Publication mailed Nov. 17, 2011, 1 page.
U.S. Appl. No. 11/480,094 Application filed Jun. 29, 2006, 125 pages.
U.S. Appl. No. 11/480,094 Notice to File Corrected Application Papers mailed Aug. 2, 2006, 2 pages.
U.S. Appl. No. 11/480,094 Response to Notice to File Corrected Application Papers filed Nov. 2, 2006, 32 pages.
U.S. Appl. No. 11/480,094 Filing Receipt mailed Dec. 7, 2006, 3 pages.
U.S. Appl. No. 11/480,094 Non-final Office Action mailed Nov. 7, 2008, 28 pages.
U.S. Appl. No. 11/480,094 Amendment filed May 7, 2009, 37 pages.
U.S. Appl. No. 11/480,094 Final Office Action mailed Jul. 28, 2009, 16 pages.
U.S. Appl. No. 11/480,094 RCE with Amendment filed Dec. 28, 2009, 39 pages.
U.S. Appl. No. 11/480,094 Office Action mailed Dec. 15, 2010, 15 pages.
U.S. Appl. No. 11/480,094 Office Action response, mailed May 16, 2011, 29 pages.
U.S. Appl. No. 11/480,094 Final Office Action, mailed Aug. 1, 2011, 13 pages.
U.S. Appl. No. 11/480,094 Amendment after final Nov. 1, 2011, 32 pages.
U.S. Appl. No. 11/480,094 Advisory Action mailed Nov. 14, 2011, 3 pages.
U.S. Appl. No. 11/480,094 Notice of Appeal mailed Nov. 28, 2011, 1 page.
U.S. Appl. No. 13/229,624, filed Sep. 9, 2011, 139 pages.
U.S. Appl. No. 13/229,624 Filing receipt, mailed Sep. 21, 2011, 4 pages.
U.S. Appl. No. 13/229,624 Non-Final Office Action, mailed Nov. 23, 2011, 8 pages.
U.S. Appl. No. 13/229,624 Notice of Publication, mailed Dec. 30, 2011, 1 page.
U.S. Appl. No. 13/229,624 Amendment, mailed Feb. 23, 2012, 22 pages.
U.S. Appl. No. 13/229,624 Final Office Action, mailed Mar. 20, 2012, 10 pages.
U.S. Appl. No. 13/229,624 Amendment after final, mailed Jun. 13, 2012, 25 pages.
U.S. Appl. No. 13/229,624 Advisory Action mailed Jun. 20, 2012, 4 pages.
U.S. Appl. No. 13/229,624 RCE, mailed Jul. 20, 2012, 26 pages.
U.S. Appl. No. 11/007,139 Appeal Brief filed May 1, 2012, 93 pages.
U.S. Appl. No. 11/007,139 Notice of defective appeal brief, mailed May 7, 2012, 3 pages.
U.S. Appl. No. 11/007,139 Appeal Brief filed May 15 2012, 9 pages.
U.S. Appl. No. 11/007,139 Examiner's answer to appeal brief, mailed Aug. 20, 2012, 35 pages.
U.S. Appl. No. 12/972,326 Non-Final Office Action, mailed Feb. 23, 2012, 9 pages.
U.S. Appl. No. 12/972,326 Abandonment, mailed Sep. 18, 2012, 2 pages.
U.S. Appl. No. 12/573,829 Examiner's Answer to Appeal Brief, mailed Jul. 21, 2011, 31 pages.
U.S. Appl. No. 12/627,816 RCE mailed Feb. 17, 2012, 20 pages.
U.S. Appl. No. 12/627,816 Terminal disclaimer review, mailed Mar. 7, 2012, 1 page.
U.S. Appl. No. 12/830,236 Amendment after final, filed Jan. 17, 2012, 26 pages.
U.S. Appl. No. 12/830,236 Advisory Action, mailed Feb. 8, 2012, 6 pages.
U.S. Appl. No. 12/830,236 Notice of Appeal filed Mar. 8, 2012, 3 pages.
U.S. Appl. No. 12/830,236 RCE, filed Jun. 5, 2012, 23 pages.
U.S. Appl. No. 12/830,236 Non-Final Office Action, mailed Jul. 31, 2012, 18 pages.
U.S. Appl. No. 11/385,257 Non-Final Office Action, mailed Jan. 9, 2012, 40 pages.
U.S. Appl. No. 11/385,257 Amendment, mailed Apr. 6, 2012, 30 pages.
U.S. Appl. No. 11/385,257 Notice of allowance and Examiner interview summary, mailed Jun. 22, 2012, 36 pages.
U.S. Appl. No. 13/625,812 Application as filed on Sep. 24, 2012, 123 pages.
U.S. Appl. No. 11/319,758 Final Office Action, mailed Jan. 17, 2012, 22 pages.
U.S. Appl. No. 11/319,758 Amendment after final, mailed May 17, 2012, 34 pages.
U.S. Appl. No. 11/319,758 Advisory Action, mailed Jun. 20, 2012, 3 pages.
U.S. Appl. No. 11/319,758 Amendment after final, mailed Jun. 28, 2012, 29 pages.
U.S. Appl. No. 11/319,758 Notice of Allowance and examiner's interview summary, mailed Jul. 17, 2012, 10 pages.
U.S. Appl. No. 12/613,450 Non-Final Office Action, mailed Aug. 25, 2011, 15 pages.
U.S. Appl. No. 12/613,450 Final rejection, mailed Feb. 14, 2012, 14 pages.
U.S. Appl. No. 12/613,450 Amendment after final, mailed Jun. 8, 2012, 23 pages.
U.S. Appl. No. 12/613,450 Advisory Action, mailed Jun. 20, 2012, 4 pages.
U.S. Appl. No. 12/613,450 RCE, mailed Jul. 12, 2012, 25 pages.
U.S. Appl. No. 12/702,243 Non-Final rejection, mailed Aug. 30, 2012, 8 pages.
U.S. Appl. No. 13/030,084 Amendment, mailed Jan. 26, 2012, 35 pages.
U.S. Appl. No. 13/030,084 Notice regarding non-compliant amendment, mailed Mar. 31, 2012, 4 pages.
U.S. Appl. No. 13/030,084 Amendment, mailed Feb. 9, 2012, 35 pages.
U.S. Appl. No. 13/030,084 Final Rejection, mailed Mar. 28, 2012, 62 pages.
U.S. Appl. No. 13/030,084 Amendment after final, mailed Jun. 14, 2012, 88 pages.
U.S. Appl. No. 13/030,084 Advisory Action, mailed Jun. 26, 2012, 4 pages.
U.S. Appl. No. 13/030,084 RCE, mailed Jul. 23, 2012, 89 pages.
U.S. Appl. No. 13/030,084 Notice regarding non-compliant amendment, mailed Jul. 25, 2012, 2 pages.
U.S. Appl. No. 11/480,094 Abandonment, mailed Jul. 13, 2012, 2 pages.
U.S. Appl. No. 11/007,139, mailed Oct. 22, 2012, 29 pages.
U.S. Appl. No. 11/007,139, mailed Nov. 16, 2012, 2 pages.
U.S. Appl. No. 12/830,236, filed Nov. 1, 2012, 27 pages.
U.S. Appl. No. 12/830,236, mailed Feb. 27, 2013, 35 pages.

(56) References Cited

OTHER PUBLICATIONS

U.S. Appl. No. 12/830,236, mailed Jun. 27, 2013, 36 pages.
U.S. Appl. No. 12/830,236, mailed Jul. 12, 2013, 4 pages.
U.S. Appl. No. 12/830,236, filed Jul. 19, 2013, 2 pages.
U.S. Appl. No. 11/385,257, mailed Oct. 4, 2012, 4 pages.
U.S. Appl. No. 11/385,257, mailed Oct. 15, 2012, 3 pages.
U.S. Appl. No. 11/385,257, mailed Dec. 12, 2012, 10 pages.
U.S. Appl. No. 11/385,257, mailed Dec. 22, 2012, 1 page.
U.S. Appl. No. 13/625,812, mailed Oct. 15, 2012, 6 pages.
U.S. Appl. No. 13/625,812, mailed Mar. 18, 2013, 47 pages.
U.S. Appl. No. 13/625,812, mailed Mar. 15, 2013, 3 pages.
U.S. Appl. No. 13/625,812, mailed Apr. 2, 2013, 5 pages.
U.S. Appl. No. 13/625,812, mailed Jul. 26, 2013, 29 pages.
U.S. Appl. No. 11/319,758, mailed Oct. 12, 2012, 12 pages.
U.S. Appl. No. 11/319,758, mailed Oct. 31, 2012, 1 page.
U.S. Appl. No. 11/320,538, mailed Dec. 19, 2012, 12 pages.
U.S. Appl. No. 11/320,538, mailed Apr. 17, 2013, 20 pages.
U.S. Appl. No. 12/702,243, mailed Nov. 20, 2012, 14 pages.
U.S. Appl. No. 12/702,243, mailed Jan. 2, 2013, 5 pages.
U.S. Appl. No. 12/702,243, mailed Jan. 4, 2013, 1 page1.
U.S. Appl. No. 12/702,243, mailed Jan. 10, 2013, pages.
U.S. Appl. No. 12/702,243, mailed Apr. 24, 2013, 1 page.
U.S. Appl. No. 13/030,084, mailed Jan. 2, 2013, 40 pages.
U.S. Appl. No. 13/030,084, mailed Jan. 23, 2013 17 pages.
U.S. Appl. No. 13/030,084, mailed Apr. 30, 2013, 39 pages.
U.S. Appl. No. 11/007,139, mailed Oct. 2, 2013, 9 pages.
U.S. Appl. No. 12/627,816, mailed Aug. 1, 2013, 16 pages.
U.S. Appl. No. 12/830,236, filed Sep. 18, 2013, 44 pages.
U.S. Appl. No. 13/625,812, mailed Aug. 1, 2013, 1 page.
U.S. Appl. No. 13/625,812, mailed Oct. 9, 2013, 15 pages.
U.S. Appl. No. 12/613,450, mailed Oct. 7, 2013, 20 pages.
U.S. Appl. No. 11/320,538, mailed Aug. 1, 2013, 25 pages.
U.S. Appl. No. 13/030,084, mailed Jul. 30, 2013, 28 pages.
U.S. Appl. No. 13/030,084, mailed Oct. 10, 2013, 44 pages.

* cited by examiner

400

$Q(0) \Rightarrow 2$ $Q(1) \Rightarrow 3$ $Q(2) \Rightarrow 5$ $Q(3) \Rightarrow 7$ $Q(4) \Rightarrow 11$ $Q(5) \Rightarrow 13$ $Q(6) \Rightarrow 17$ $Q(7) \Rightarrow 19$ $Q(8) \Rightarrow 23$ $Q(9) \Rightarrow 29$ $Q(10) \Rightarrow 31$ $Q(11) \Rightarrow 37$ $Q(12) \Rightarrow 41$

Finite Rooted Unordered 2 Valued Edge-Labeled Trees

Signature = <2, 2, 1>
Alphabet = {0, 1, A, B, *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1.$$

*Core Model Isomorph (based upon the natural number universe)*

$$A(x) = Q(2x - 2), x \text{ not } 0;$$
$$B(x) = Q(2x - 1), x \text{ not } 0;$$

$$(x * y) = (x \text{ multiplied by } y).$$

Fig. 7

Finite Rooted Unordered 3 Valued Edge-Labeled Trees

*Signature* = < 2, 3, 1 >
*Alphabet* = {0, 1, A, B, C, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1.$$

*Core Model Isomorph (based upon the natural number universe)*

$$A(x) = Q(3x - 3), x \text{ not } 0;$$
$$B(x) = Q(3x - 2), x \text{ not } 0;$$
$$C(x) = Q(3x - 1), x \text{ not } 0;$$

$$(x * y) = (x \text{ multiplied by } y).$$

Fig. 8

Finite Rooted Unordered 4 Valued Edge-Labeled Trees

*Signature* = < 2 , 4 , 1 >
*Alphabet* = {0, 1, A, B, C, D, * }

*Expressions*

910 — $(x * y) = (y * x);$
920 — $((x * y) * z) = (x * (y * z));$

930 — $\begin{cases} (0 * x) = 0; \\ (1 * x) = x; \end{cases}$

940 — $\begin{cases} A(0) = 1; \\ B(0) = 1; \\ C(0) = 1; \\ D(0) = 1. \end{cases}$

Core Model Isomorph (based upon the natural number universe)

$A(x) = Q(4x - 4)$, $x$ not 0;
$B(x) = Q(4x - 3)$, $x$ not 0;
$C(x) = Q(4x - 2)$, $x$ not 0;
$D(x) = Q(4x - 1)$, $x$ not 0;

$(x * y) = (x$ multiplied by $y)$.

Fig. 9

Finite Rooted Unordered 5 Valued Edge-Labeled Trees

*Signature* = <2, 5, 1>
*Alphabet* = {0, 1, A, B, C, D, E *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1.$$

*Core Model Isomorph (based upon the natural number universe)*

$$A(x) = Q(5x - 5), x \text{ not } 0;$$
$$B(x) = Q(5x - 4), x \text{ not } 0;$$
$$C(x) = Q(5x - 3), x \text{ not } 0;$$
$$D(x) = Q(5x - 2), x \text{ not } 0;$$
$$E(x) = Q(5x - 1), x \text{ not } 0;$$

$$(x * y) = (x \text{ multiplied by } y).$$

1000   Fig. 10

Finite Rooted Unordered 6 Valued Edge-Labeled Trees

*Signature* = < 2, 6, 1 >
*Alphabet* = {0, 1, A, B, C, D, E, F *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1;$$
$$F(0) = 1.$$

*Core Model Isomorph (based upon the natural number universe)*

$$A(x) = Q(6x - 6), x \text{ not } 0;$$
$$B(x) = Q(6x - 5), x \text{ not } 0;$$
$$C(x) = Q(6x - 4), x \text{ not } 0;$$
$$D(x) = Q(6x - 3), x \text{ not } 0;$$
$$E(x) = Q(6x - 2), x \text{ not } 0;$$
$$F(x) = Q(6x - 1), x \text{ not } 0;$$

$$(x * y) = (x \text{ multiplied by } y).$$

1100            Fig. 11

|    | 2-ary | 3-ary | 4-ary | 5-ary | 6-ary |
|----|-------|-------|-------|-------|-------|
| 0  | ○ | ⊢----------------------------------→ | | | |
| 1  | ● | ⊢----------------------------------→ | | | |
| 2  | A●─● | ⊢----------------------------------→ | | | |
| 3  | B●─● | ⊢----------------------------------→ | | | |
| 4  | A●─●─●A | ⊢----------------------------------→ | | | |
| 5  | A●─●─●A (stack) | C●─● | ⊢--------------------→ | | |
| 6  | A●─●─●B | ⊢----------------------------------→ | | | |
| 7  | B●─●─●A | A●─●─●A | D●─● | ⊢--------→ | |
| 8  | A●─●─●A─●A | ⊢----------------------------------→ | | | |
| 9  | B●─●─●B | ⊢----------------------------------→ | | | |
| 10 | A●─●─●A─●A | A●─●─●C | ⊢--------------------→ | | |

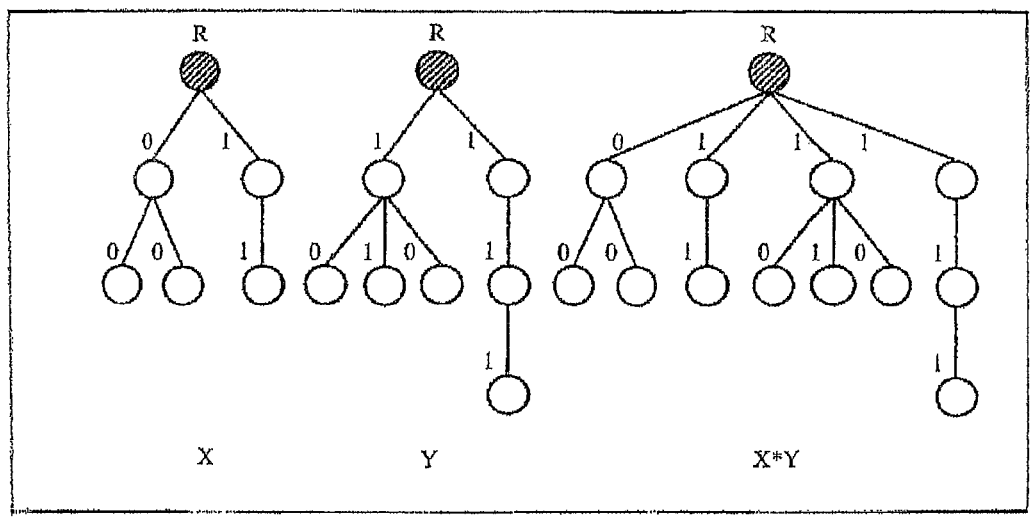
1700  Fig. 17

METHOD AND/OR SYSTEM FOR MANIPULATING TREE EXPRESSIONS

This patent application is a continuation pursuant to 35 U.S.C. §120 of U.S. patent application Ser. No. 11/006,841, titled "METHOD AND/OR SYSTEM FOR MANIPULATING TREE EXPRESSIONS," filed on Dec. 7, 2004, by LeTourneau, which claims priority pursuant to 35 U.S.C. §119 from U.S. provisional patent application Ser. No. 60/623,280, filed on Oct. 29, 2004, by LeTourneau, titled, "METHOD AND/OR SYSTEM FOR MANIPULATING TREE EXPRESSIONS," filed on Jun. 30, 2004; both of the foregoing being assigned to the assignee of the presently claimed subject matter.

BACKGROUND

This disclosure is related to manipulating tree expressions

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a table providing an embodiment of a function that relates natural numerals to composite numerals;

FIG. 7 is a table providing symbolic expressions for an embodiment of rooted, unordered, 2-valued edge-labeled trees;

FIG. 8 is a table providing symbolic expressions for an embodiment of rooted, unordered, 3-valued edge-labeled trees;

FIG. 9 is a table providing symbolic expressions for an embodiment of rooted, unordered, 4-valued edge-labeled trees;

FIG. 10 is a table providing symbolic expressions for an embodiment of rooted, unordered, 5-valued edge-labeled trees;

FIG. 11 is a table providing symbolic expressions for an embodiment of rooted, unordered, 6-valued edge-labeled trees;

FIGS. 12 and 13 provide an embodiment of a table relating the natural numerals and embodiments of different tree views;

FIG. 17 is a schematic diagram illustrating an embodiment of merging two edge-labeled trees.

DETAILED DESCRIPTION

Figure 1:
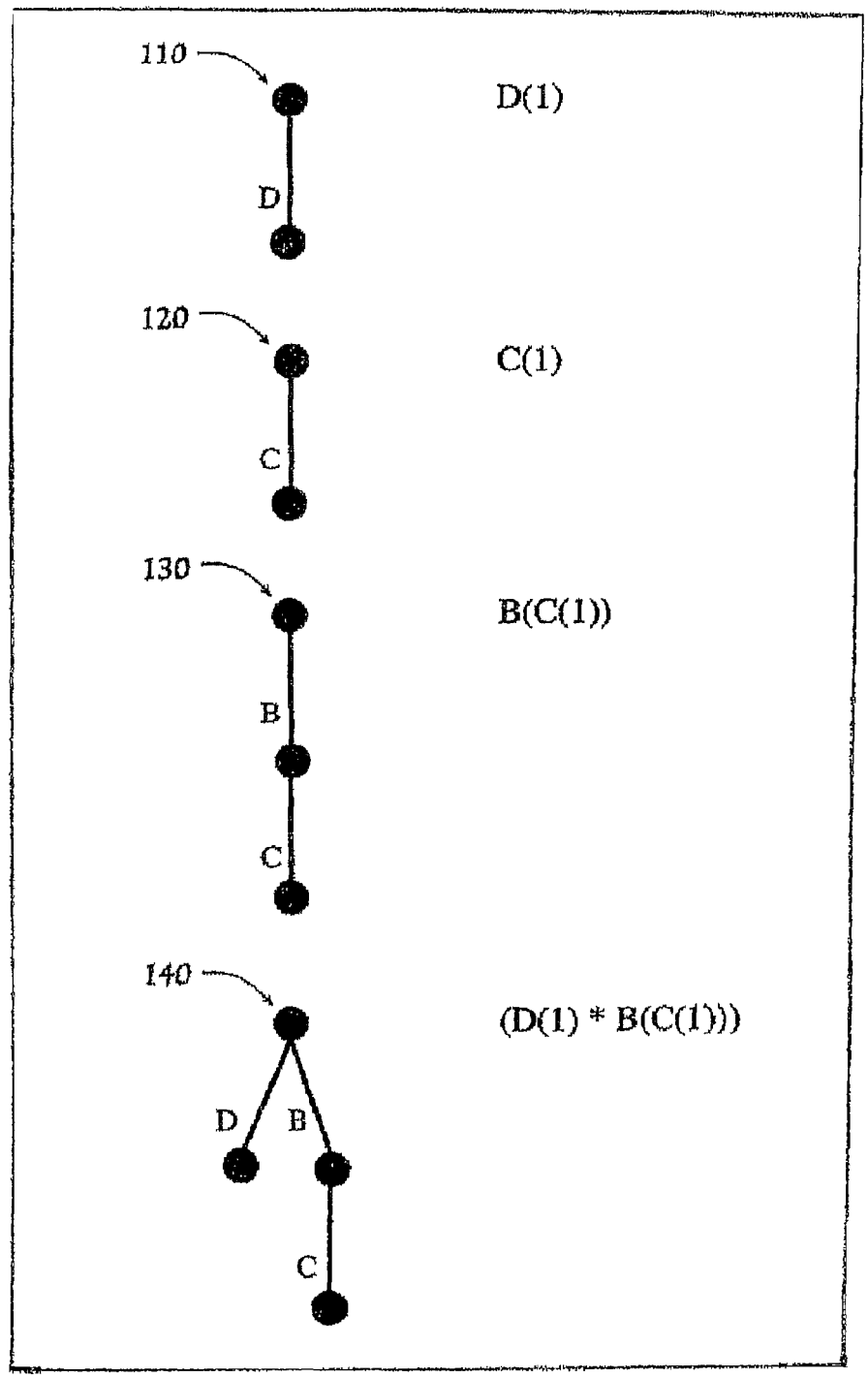
FIG. 1 is a schematic diagram of embodiments of several unordered edge-labeled trees and symbolic expressions mathematically representing the tree embodiments.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 15 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

Figure 15:
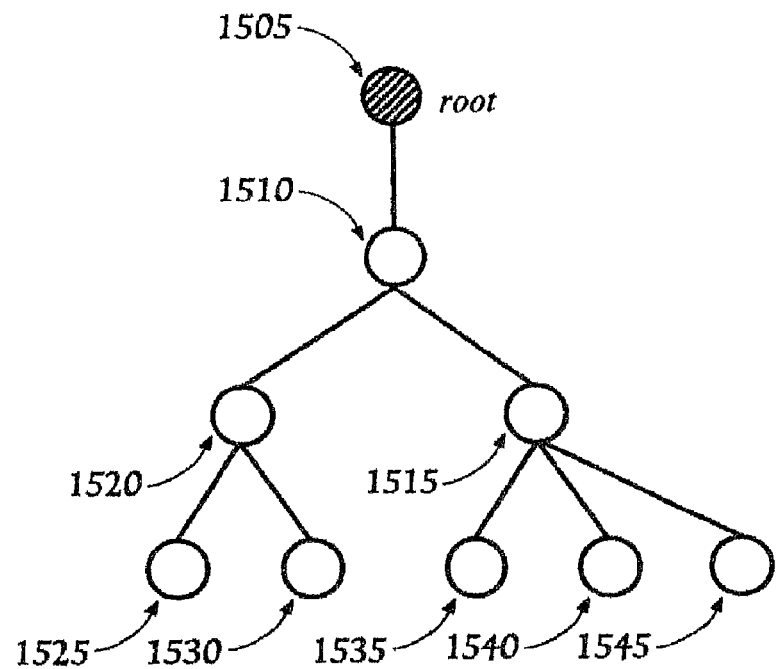
FIG. 15 is a schematic diagram of an unordered edge labeled tree.

As previously suggested, in a variety of contexts, it may be convenient and/or desirable to represent a hierarchy of data and/or other information using a structure, such as the embodiment illustrated in FIG. 15. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 8, 2004, by J. J. LeTourneau, and assigned to the assignee of the current provisional application. This is illustrated, here, for example, in FIG. 16. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371, U.S. provisional patent application Ser. No. 60/543,371 is provided simply as an example of listing or enumerating unordered BELTs.

Figure 16:
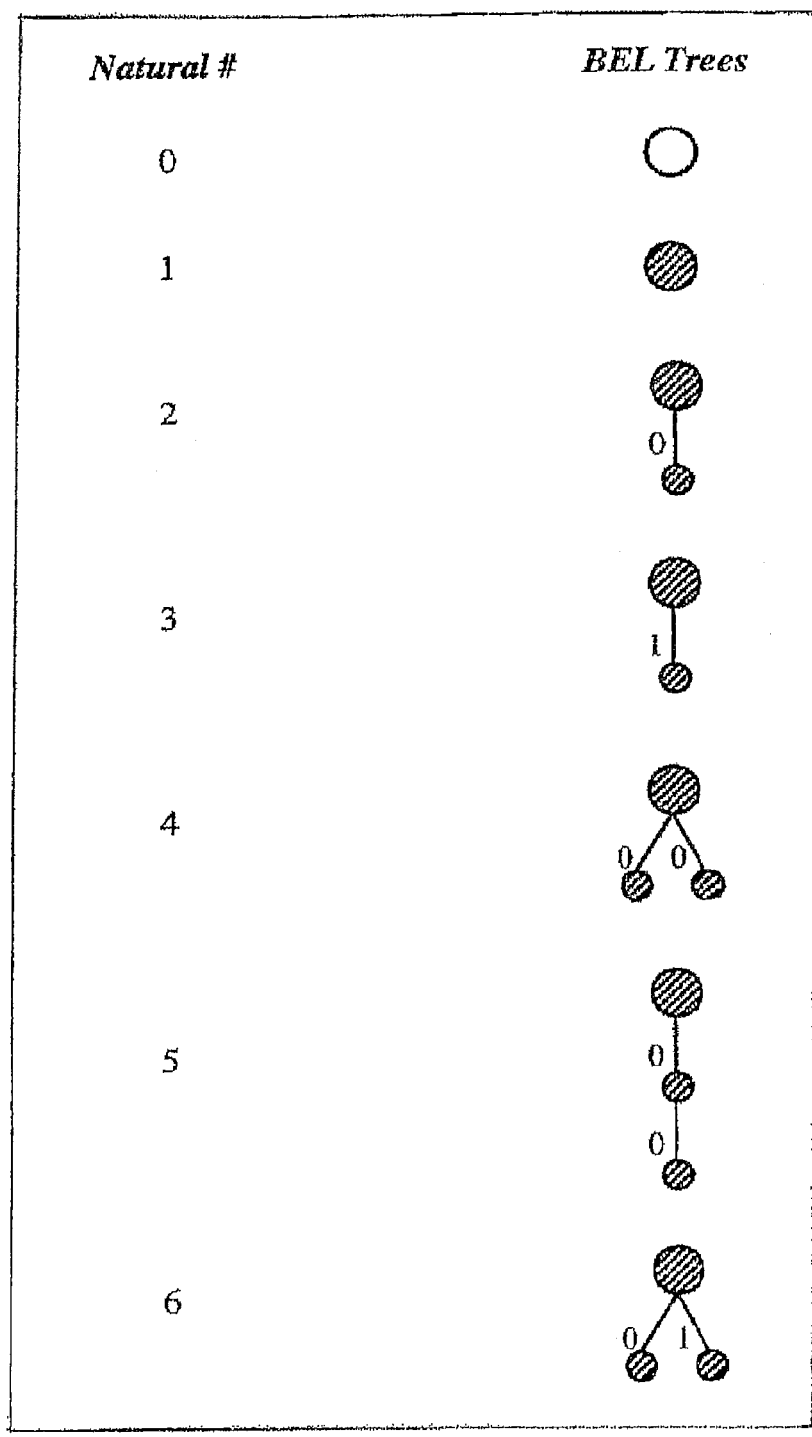
FIG. 16 is a table illustrating an embodiment of a relationship between BELTs and natural numerals.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 16 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 16, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 16, the one-push of the root tree is the tree at position three. This follows from FIG. 9 of previously referenced U.S. provisional patent application Ser. No. 60/543,371, since $Q((1*2)-1)=Q(1)=3$. Likewise, the tree at position five is the zero-push of the tree at position 2. Again, this follows from FIG. 9 of the previously referenced US provisional patent application, since Q((2*2)−2)=Q(2)=5.

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., as previously described and as explained in more detail hereinafter.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots. This operation is illustrated, for example, in FIG. 17.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

Figure 4:
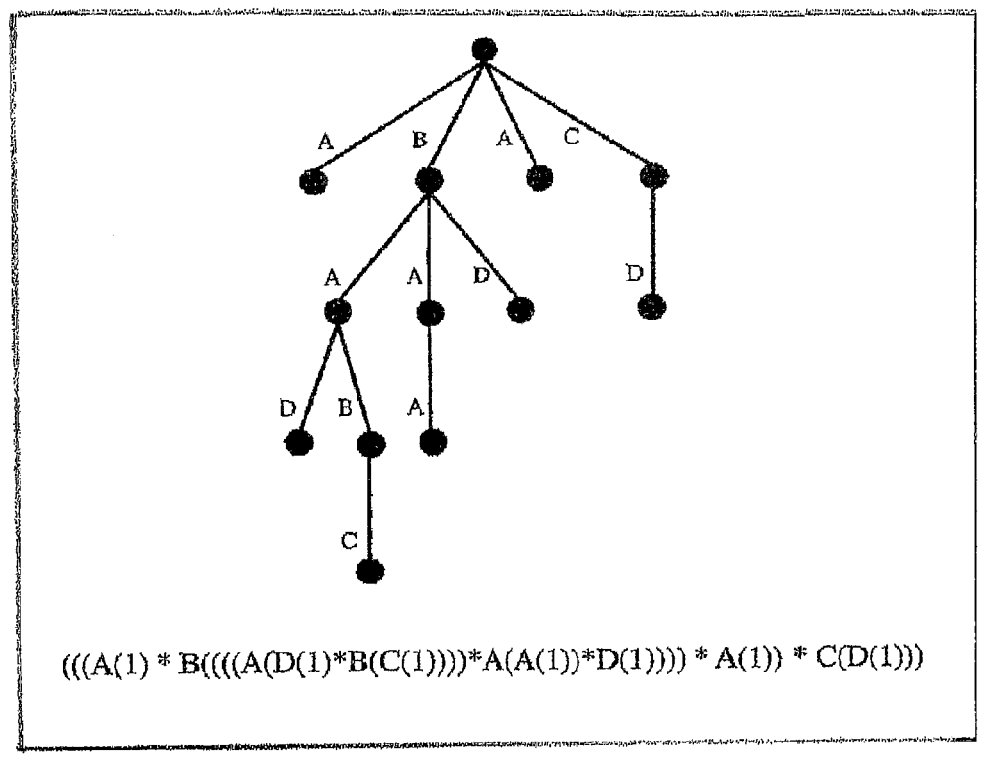
FIG. 4 is a schematic diagram illustrating an embodiment of an unordered edge-labeled tree and a symbolic expression mathematically representing the tree embodiment.

FIG. 4 is schematic diagram illustrating an embodiment of an edge labeled tree, here a 4 valued edge labeled tree. In this particular embodiment, four distinct values are employed to label the edges. Here, the labels comprising A, B, C and D, although, of course, the claimed subject matter is not limited to 4 valued edge labeled trees, to edge labeled trees, or to employing these particular edge labels. It is noted that the labels A, B, C, and D in this embodiment are similar to the labels binary 0 and binary 1 for BELTs. Below tree 400 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

To assist in understanding the relationship between the symbolic expression shown in FIG. 4 and tree 400, for this particular embodiment, FIG. 1 provides an embodiment 110 of another tree. As illustrated, tree 110 comprises an edge label D connecting two nodes. For this particular context, this embodiment may be expressed symbolically as follows: D(1). Thus, a technique to describe the embodiment of tree 110 would refer to the "push" of the natural number 1. Here, for this particular embodiment, this particular push operation comprises the "D" push of 1, resulting in D being the label of the edge connecting the two nodes. More specifically, as previously described, a single node comprises the natural numeral 1 in this particular embodiment. To perform a push operation, an edge is attached to that node and labeled. Here, applying a D push, the label provided comprises the label D.

Figure 2:
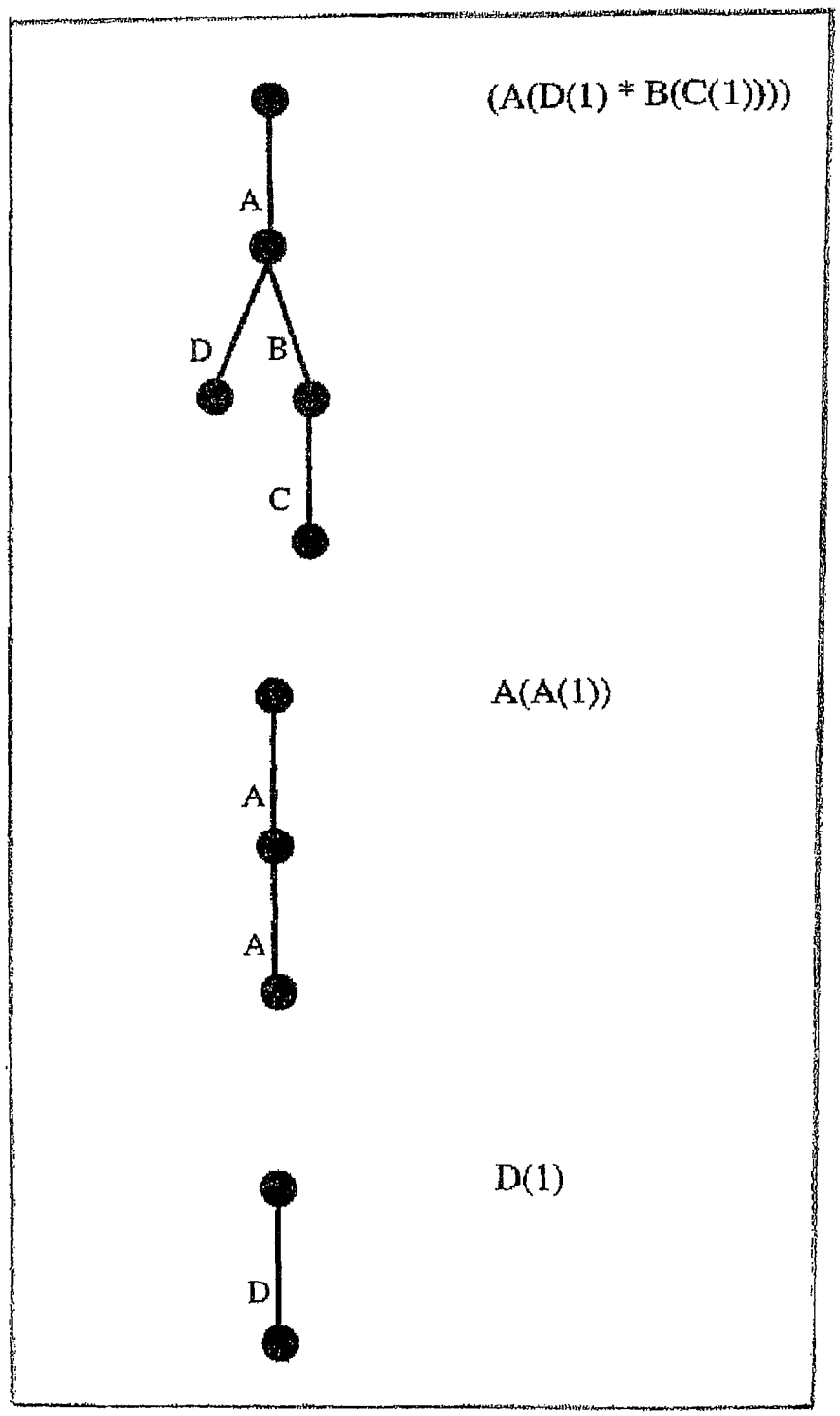
FIG. 2 is a schematic diagram of embodiments of several unordered edge-labeled trees and symbolic expressions mathematically representing the tree embodiments.
Figure 3:
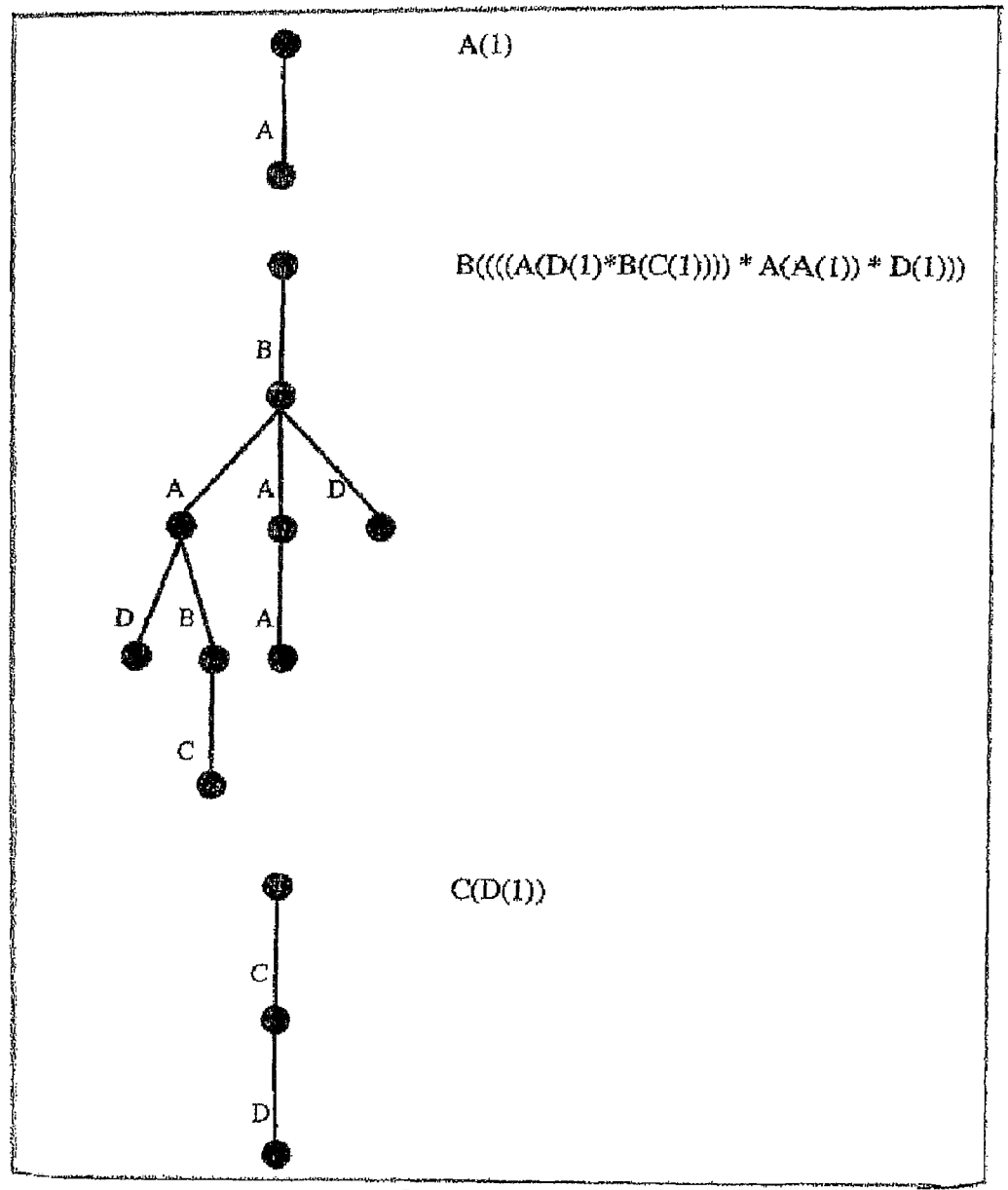
FIG. 3 is a schematic diagram of embodiments of several unordered edge-labeled trees and symbolic expressions mathematically representing the tree embodiments.

Continuing, the "C" push of "1" is illustrated as two nodes with an edge labeled C connecting the two nodes for tree embodiment 120. Applying similar reasoning provides an edge labeled tree embodiment 130 representing the following expression: B(C(1)). Likewise, for this particular embodiment, the operation of merger may be represented as "*", as previously suggested. Thus, applying a merger operation provides tree embodiment 140 at the bottom of FIG. 1 corresponding, for this particular embodiment, to the following expression: (D(1)*B(C(1))). Applying similar reasoning to FIGS. 2 and 3 and the tree embodiments shown ultimately produces tree 400 illustrated in FIG. 4, along with the corresponding symbolic expression.

As the previous discussion suggests, here A, B, C and D comprise monadic operators and the merger operation comprises a binary operation. In U.S. provisional patent application Ser. No. 60/575,784, titled "Method and/or System for Simplifying Tree Expressions, such as for Pattern Matching," filed May 28, 2004, by J. J. LeTourneau, assigned to the assignee of the current application, monadic operators similar to those described here were designed as successor operators, using the symbol S(x). Here, these monadic operators comprise multiple successive operators.

Figure 5:
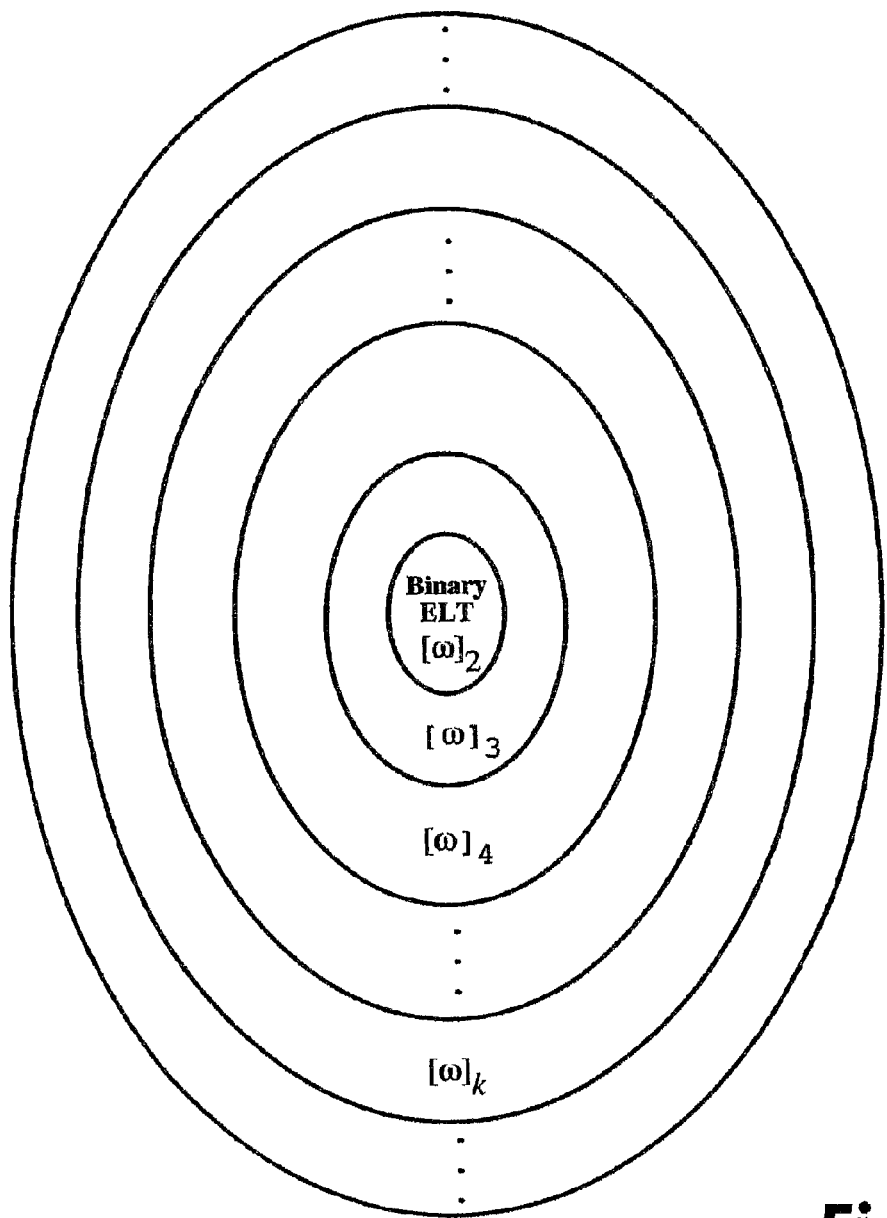
FIG. 5 is a schematic diagram illustrating all N-valued rooted, unordered, edge-labeled trees, where N is a natural numeral greater than or equal to 2.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 5, a Venn diagram 500 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may represent or store. More specifically, an identical tree may represent different data depending at least in part on whether the tree is "viewed" as, to continue with this example, a two valued edge labeled tree or a three valued edge labeled tree. Thus, in this embodiment, we refer to this as the "view" of the particular tree. For example, a two valued edge labeled tree is referred to as view 2 and a three valued edge labeled tree is referred to as view 3, although, for example, the particular tree may not contain three different values. The view in this embodiment refers to the set of distinct values from which the labels may be selected, as previously described. FIG. 5 therefore depicts the set of all edge labeled trees as the union of all such edge labeled trees in which the edge values are selected from a set having a specific number of distinct values.

Previously in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with edge labeled trees of any number of distinct edge values.

As previously suggested in aforementioned U.S. provisional patent application No. 60/575,784, a set of congruence operations on the set of tree expressions may be isomorphic to the set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

Thus, beginning with binary edge labeled trees or finite rooted unordered two valued edge labeled trees, but continuing to edge labeled trees of higher numbers of values, such as, for example, three valued edge labeled trees, four valued edge labeled trees and so forth, for this embodiment, a similar association or relationship between tree expressions and edge labeled trees may be constructed. Thus, for this embodiment, with a set of operations that satisfies a set of tree expressions an isomorphism with a set of finite routed unordered N valued edge labeled trees results in a similar one to one relationship between the equivalence classes that satisfy the tree expressions and the edge labeled trees themselves. Likewise, by demonstrating that these tree expressions are also isomorphic with natural numerals, tree manipulations are able to be constructed for edge labeled trees using natural numerals, as had similarly been done for binary edge labeled trees. Thus, as shall become more clear hereinafter, manipulating tree expressions is isomorphic to manipulating numerals for this particular embodiment.

Previously, binary edge labeled trees have been discussed. For purposes of illustration, it shall instructive to now discuss another type of edge labeled tree, such as four valued edge labeled trees. For example, FIG. 9 corresponds to finite rooted unordered four valued edge labeled trees, which were also discussed previously with respect to FIG. 4. Thus, for this example embodiment, an algebra may be constructed that is isomorphic to the natural numerals for such four valued edge labeled trees. Likewise, similar algebras may be constructed by use a similar set of tree expressions, as shown, for example, by FIGS. 7, 8, 10 and 11. The similarity of these expressions allows us to write a schema or generalized description and thereby cover all such similar algebras.

Thus, similar to an approach previously described, FIG. 9 provides a set of constants and operators here, constants 0 and 1, monadic operators A, B, C, and D and binary operator *. Thus, we designate this algebra with the signature <2,4,1> as a result. The expressions for this particular embodiment are provided in FIG. 9. The first expression, 910, denotes communitivity and the second expression, 920, denotes associativity. Likewise, the next two expressions, 930, define the relationship of the merger of the constants with any other value. The next four expressions, 940, define the monadic operators A, B, C and D.

Thus, for this embodiment, these expressions therefore define a set of edge labeled trees with particular properties. Specifically, the properties are isomorphic to the natural numerals. Thus, as shall be demonstrated further, for this embodiment, four valued edge labeled trees, for example, may be manipulated using natural numerals.

Figure 13:

At least in part because natural numerals are isomorphic to N valued trees, a way to depict this relationship for this embodiment is illustrated by FIGS. 12 and 13. Previously, a particular view for a particular edge labeled tree, for this embodiment, was discussed. In these figures, each column represents a different potential view for a set of edge labeled trees for this embodiment. Likewise, each row provides the edge labeled tree in the view corresponding to the column for the natural number on the left-hand side of FIG. 12.

For example, column one shows the trees with for two valued edge labeled trees edges, otherwise referred to as binary edge labeled trees. Thus, as previously described, no nodes corresponds to "0". Continuing, a single node corresponds to "1" or to "root". Likewise, the numerals two and three in this view turn out to be push operations. In this case, the numeral 2 is the tree corresponding to the A push of one denoted A(1). Likewise, the numeral 3 is the tree corresponding to the B push of one, denoted B(1).

For this embodiment, these relationships may also be confirmed by referring back to FIG. 7. Here, the operations A(x) and B(x) as defined in terms of the function, previously defined in connection with FIG. 6. Thus, using these expressions, to determine the push of 1 denoted A(1), as provided in FIG. 7, this is Q((2*1)−2). This provides Q(0) or the value 2, as demonstrated from FIG. 6. As similar result may be obtained for B(1). Referring to FIG. 7, this corresponds to Q((2*1)−1), or Q(1), again from FIG. 6, the value 3.

A similar relationship may be established for three valued edge labeled trees, described by the expressions provided in FIG. 8, for example. Referring again to FIGS. 12 and 13, the edge labeled trees corresponding to these expressions are depicted in the second column. It is noted that the tree structures using this notation are the same between the first column and the second column for the numerals from zero to four. However, a difference is noted between the first column and the second column at numeral 5. Thus, for view 3, the numeral 5 is the C push of 1. More particularly, again referring to FIG. 8, C(1) equals Q(3*1)−1), or Q(2). From FIG. 6, the corresponding value is 5, as previously suggested. Similarly, looking at column 3 of FIG. 12, for view 5, the D push of 1 is numeral 7.

Thus, for this embodiment, regardless of the "view" of the edge labeled trees, there is a unique one to one correspondence, here, an association embodiment, between the natural numerals and that set of edge labeled trees. This embodiment, therefore, provides the capability to manipulate and combine edge labeled trees of different view. For example, for two edge labeled trees from two different views, one of the edge labeled trees may be converted so that the two edge labeled trees are in the same view. Once in the same view, the trees may be manipulated, such as by a merger, for example. Likewise, in an alternative embodiment, both trees may be converted to numerals, the numerals may be manipulated and then the manipulated numerals may be converted back to edge labeled trees of a particular view. Likewise, the edge labeled trees may be converted to any desirable view.

It is likewise noted that for this particular embodiment one way of manipulation an edge labeled tree is to apply a push operation to the edge labeled tree. Likewise, as previously described, for this embodiment, a push operation comprises adding an edge and labeling it. Assuming for this embodiment that the labels for the edge labeled tree comprise numerals, the label for a particular view will be a numeral that is less than the view itself. For example if the view is 5 than the set of distinct values to label an edge comprises 0, 1, 2, 3 or 4. Of course, this is merely one potential embodiment and the claimed subject matter is not limited in scope in this respect. For example, as previously described, letters may be employed. Likewise, any set of values where each value is distinct may be employed and remain within the scope of the claimed subject matter.

A similar set of manipulations may be applied to node labeled trees rather than edge labeled trees. Thus, node labeled trees may be represented in different views, may be converted to the same view, may be converted to numerals, combined, and converted back to a node labeled tree of a particular view. Likewise, a push operation may be applied to a node labeled tree, as previously described for edge labeled trees.

Although the claimed subject matter is not limited in scope in this respect, one technique for implementing this approach may be to apply a table look up approach. For example, a table providing different embodiments associating different views to natural numerals may be employed. Of course, the claimed subject matter is not limited in scope in this respect. For example, instead, a table look-up may be employed for the operation Q and the expressions previously described may be applied to perform manipulations, such as those previously illustrated, for example.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

As described in prior embodiments, one technique for manipulating edge labeled trees includes converting such trees to natural numerals, performing manipulation of the natural numerals, and converting back to an edge labeled tree of a particular view. Furthermore, as described above, one technique for such conversions may include table look-up, as described above. Likewise, in another embodiment, it may be possible to convert a natural numeral directly to an edge labeled tree using a table look-up for the operation Q, previously described. For example, if it were desirable to convert the natural numeral 61 to an edge labeled tree in view 4, the numeral could be factored and the factors converted to trees. In this example, 61 is a non-composite, so, using a table look-up, Q(17) provides 61. Thus, 61 is a push of 17. Using the expressions provided on FIG. 9, for example, we may determine whether 61 is the A, B, C, or D push of 17 and so forth. Likewise, for this particular embodiment, previously an example of converting between an edge labeled tree of a particular view and a natural numeral was provided.

Embodiments of a method of manipulating tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching See, for example, "A VLSI Architecture for Object Recognition using Tree Matching" K. Sitaraman, N. Ranganathan and A. Ejnioui; Proceedings of the IEEE International Conference on Application-Specific Systems, Architectures, and Processors (ASAP'02) 2000; "Expressive and efficient pattern languages for tree-structured data" by Frank Neven and Thomas Schwentick; Proceedings of the Nineteenth ACM SIGACT-SIGMOD-SIGART Symposium on Principles of Database Systems, May 2000. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming.

Figure 14:
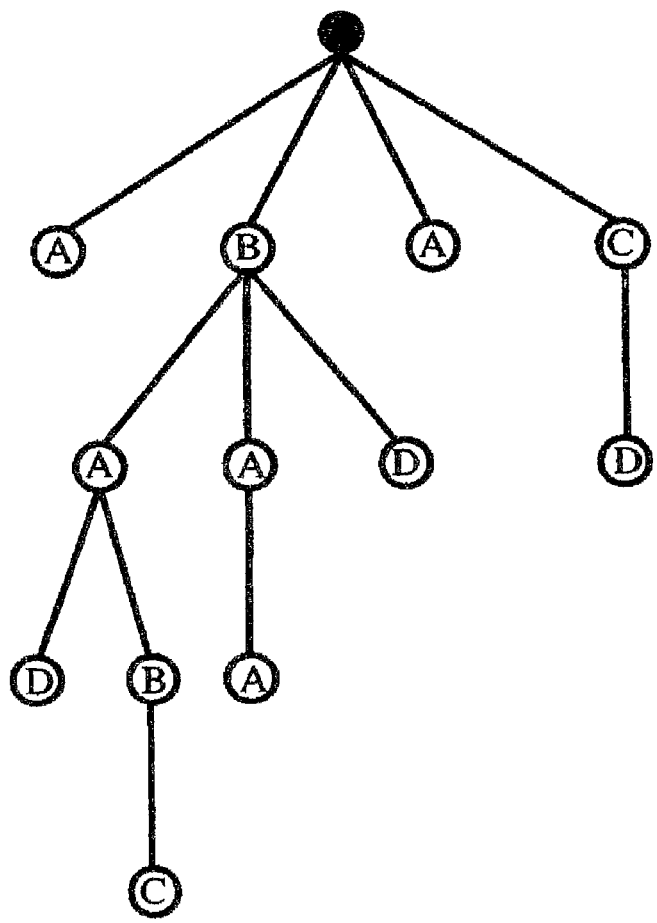
FIG. 14 is a schematic diagram of an unordered node labeled tree.

Of course, the claimed subject matter is not limited to unordered edge labeled trees. For example, as described in previously cited U.S. provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). One example of a NLT is illustrated in the diagram of FIG. 14 by tree 1400. As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. Typically, different views shall be employed, depending at least in part, for example, upon the particular type of tree. Furthermore or alternatively, as described in the previously referenced U.S. provisional patent application 60/543,371, a node labeled tree in which the nodes are labeled with natural numerals or data values may be converted to an edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of ELTs.

In another embodiment, however, a particular tree may include null types or, more particularly, some node values denoted by the empty set. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied.

Furthermore, a tree in which both the nodes and the edges are labeled may be referred to in this context as a feature tree and may be converted to an edge labeled tree and/or a node labeled tree. For example, without intending to limit the scope of the claimed subject matter, in one approach, a feature tree may be converted by converting any labeled node with its labeled outgoing edge to an ordered pair of labels for the particular node.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of manipulating an edge-labeled tree (ELT) comprising:
   executing instructions on one or more processors, said executing comprising:
   converting a first ELT in a first view, said first ELT in said first view being in the form of digital electronic signals, to a first ELT in a second view, said first ELT in said second view also being in the form of digital electronic signals;
   and further comprising: combining said first ELT in said second view with a second ELT in said second view;
   wherein said combining comprises:
   converting said ELTs in said second view to numerals;
   combining said numerals; and
   converting said combined numerals to an ELT;
   said executing to at least further database management operations and/or to facilitate pattern matching operations.

2. The method of claim 1, wherein said converting said ELTs to natural numerals includes employing a model of expressions in which a merger operation has the form: X merged with Y=X*Y.

3. The method of claim 1, wherein said ELT comprises an ELT in said second view.

4. The method of claim 1, wherein said ELT comprises an ELT in a view other than said second view.

5. The method of claim 1, and further comprising: applying a push operation to said first ELT in said second view.

6. The method of claim 5, and further comprising: converting said first ELT in said second view to a natural numeral after applying said push operation.

7. The method of claim 6, wherein said converting said first ELT to a natural numeral includes employing a model of expressions in which a push operation has the form Push(x) =Q(Rx−s), where R and S are natural numerals and R>S.

8. An article comprising:
   a storage medium having stored thereon instructions executable by one or more processors so as to result in performance of a method of manipulating an edge-labeled tree (ELT) as follows:
   converting a first ELT in a first view, said first ELT in said first view being in the form of digital electronic signals, to a first ELT in a second view, said first ELT in said second view also being in the form of digital electronic signals;

and further comprising: combining said first ELT in said second view with a second ELT in said second view;

wherein said combining comprises:

converting said ELTs in said second view to numerals;

combining said numerals; and converting said combined numerals to an ELT;

said performance to at least further database management operations and/or to facilitate pattern matching operations.

9. The article of claim 8, wherein said instructions, when executed, further result in said converting said ELTs to natural numerals including employing a model of expressions in which a merger operation has the form: X merged with Y=X*Y.

10. The article of claim 8, wherein said instructions, when executed, further result in said ELT comprising an ELT in said second view.

11. The article of claim 8, wherein said instructions, when executed, further result in said ELT comprising an ELT in a view other than said second view.

12. The article of claim 8, wherein said instructions, when executed, further result in: applying a push operation to said first ELT in said second view.

13. The article of claim 12, wherein said instructions, when executed, further result in: converting said first ELT in said second view to a natural numeral after applying said push operation.

14. The article of claim 13, wherein said instructions, when executed, further result in said converting said first ELT to a natural numeral including employing a model of expressions in which a push operation has the form: Push(x)=Q(Rx−s), where R and S are natural numerals and R>S.

15. An apparatus comprising:

a computing platform comprising a computing device;

said computing platform being adapted to, via said computing device, convert a first ELT in a first view, said first ELT in said first view being in the form of digital electronic signals, to a first ELT in a second view, said ELT in said second view being in the form of digital electronic signals;

wherein said computing platform is further adapted to combine said first ELT in said second view with a second ELT in said second view;

wherein said computing platform further adapted to convert said ELTs in said second view to numerals, combine said numerals, and convert said combined numerals to an ELT;

wherein said computing platform at least to further database management operations and/or to facilitate pattern matching operations.

16. The apparatus of claim 15, wherein said computing platform is adapted to convert said ELTs to natural numerals by employing a model of expressions in which a merger operation has the form: X merged with Y=X*Y.

17. The apparatus of claim 15, wherein said computing platform is further adapted to convert said ELT to an ELT in said second view.

18. The apparatus of claim 15, wherein said computing platform is further adapted to convert said ELT to an ELT in a view other than said second view.

19. The apparatus of claim 15, wherein said computing platform is further adapted to apply a push operation to said first ELT in said second view.

20. The apparatus of claim 19, wherein said computing platform is further adapted to convert said first ELT in said second view to a natural numeral after applying said push operation.

21. The apparatus of claim 20, wherein said computing platform is adapted to convert said first ELT to a natural numeral by employing a model of expressions in which a push operation has the form: Push(x)=Q(Rx−s), where R and S are natural numerals and R>S.

22. An apparatus comprising: a computing platform comprising a computing device;

said computing platform comprising means to convert a first ELT in a first view, said first ELT in said first view being in the form of digital electronic signals, to a first ELT in a second view, said first ELT in said second view being in the form of digital electronic signals;

wherein said computing platform further comprises means to combine said first ELT in said second view with a second ELT in said second view;

wherein said computing platform further comprises means to convert said ELTs in said second view to numerals, means to combine said numerals, and means to convert said combined numerals to an ELT;

wherein said computing platform at least to further database management operations and/or to facilitate pattern matching operations.

23. The apparatus of claim 22, wherein said means to convert said ELTs to natural numerals comprises means to employ a model of expressions in which a merger operation has the form: X merged with Y=X*Y.

24. The apparatus of claim 22, wherein said computing platform further comprises means to convert said ELT to an ELT in said second view.

25. The apparatus of claim 22, wherein said computing platform further comprises means to convert said ELT to an ELT in a view other than said second view.

26. The apparatus of claim 22, wherein said computing platform further comprises means to apply a push operation to said first ELT in said second view.

27. The apparatus of claim 26, wherein said computing platform further comprises means to convert said first ELT in said second view to a natural numeral after applying said push operation.

28. The apparatus of claim 27, wherein said means to convert said first ELT to a natural numeral comprises means to employ a model of expressions in which a push operation has the form: Push(x)=Q(Rx−s), where R and S are natural numerals and R>S.

* * * * *